United States Patent
Mandal et al.

(10) Patent No.: US 12,111,762 B2
(45) Date of Patent: Oct. 8, 2024

(54) DYNAMIC INCLUSIVE LAST LEVEL CACHE

(71) Applicant: Intel Corporation, Santa Clara, CA (US)

(72) Inventors: Ayan Mandal, Bangaluru (IN); Leon Polishuk, Haifa (IL); Oz Shitrit, Tel Aviv (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 17/130,676

(22) Filed: Dec. 22, 2020

(65) Prior Publication Data

US 2022/0197797 A1  Jun. 23, 2022

(51) Int. Cl.
*G06F 3/06* (2006.01)
*G06F 12/0811* (2016.01)
*G06F 12/0815* (2016.01)
*G06F 12/128* (2016.01)

(52) U.S. Cl.
CPC ...... *G06F 12/0811* (2013.01); *G06F 12/0815* (2013.01); *G06F 12/128* (2013.01); *G06F 2212/1032* (2013.01)

(58) Field of Classification Search
CPC ............. G06F 12/0811; G06F 12/0815; G06F 12/0831; G06F 12/084; G06F 12/0888; G06F 12/0897; G06F 12/0862; G06F 2212/1032; G06F 2212/1044
See application file for complete search history.

(56) References Cited

U.S. PATENT DOCUMENTS

| | | | |
|---|---|---|---|
| 9,727,489 B1* | 8/2017 | Drerup | G06F 12/0811 |
| 10,180,905 B1* | 1/2019 | Meier | G06F 12/0862 |
| 2014/0281239 A1* | 9/2014 | Novakovsky | G06F 12/0837 |
| | | | 711/119 |
| 2016/0092366 A1 | 3/2016 | Pal et al. | |
| 2019/0087344 A1* | 3/2019 | Hijaz | G06F 12/128 |

OTHER PUBLICATIONS

Extended European Search Report from European Patent Application No. 21195669.3 notified Mar. 3, 2022, 8 pgs.
Office Action from European Patent Application No. 21195669.3 notified Jan. 24, 2024, 5 pgs.

* cited by examiner

*Primary Examiner* — Khoa D Doan
(74) *Attorney, Agent, or Firm* — Essential Patents Group, LLP

(57) ABSTRACT

An embodiment of an integrated circuit may comprise a core, and a cache controller coupled to the core, the cache controller including circuitry to identify data from a working set for dynamic inclusion in a next level cache based on an amount of re-use of the next level cache, send a shared copy of the identified data to a requesting core of one or more processor cores, and maintain a copy of the identified data in the next level cache. Other embodiments are disclosed and claimed.

14 Claims, 21 Drawing Sheets

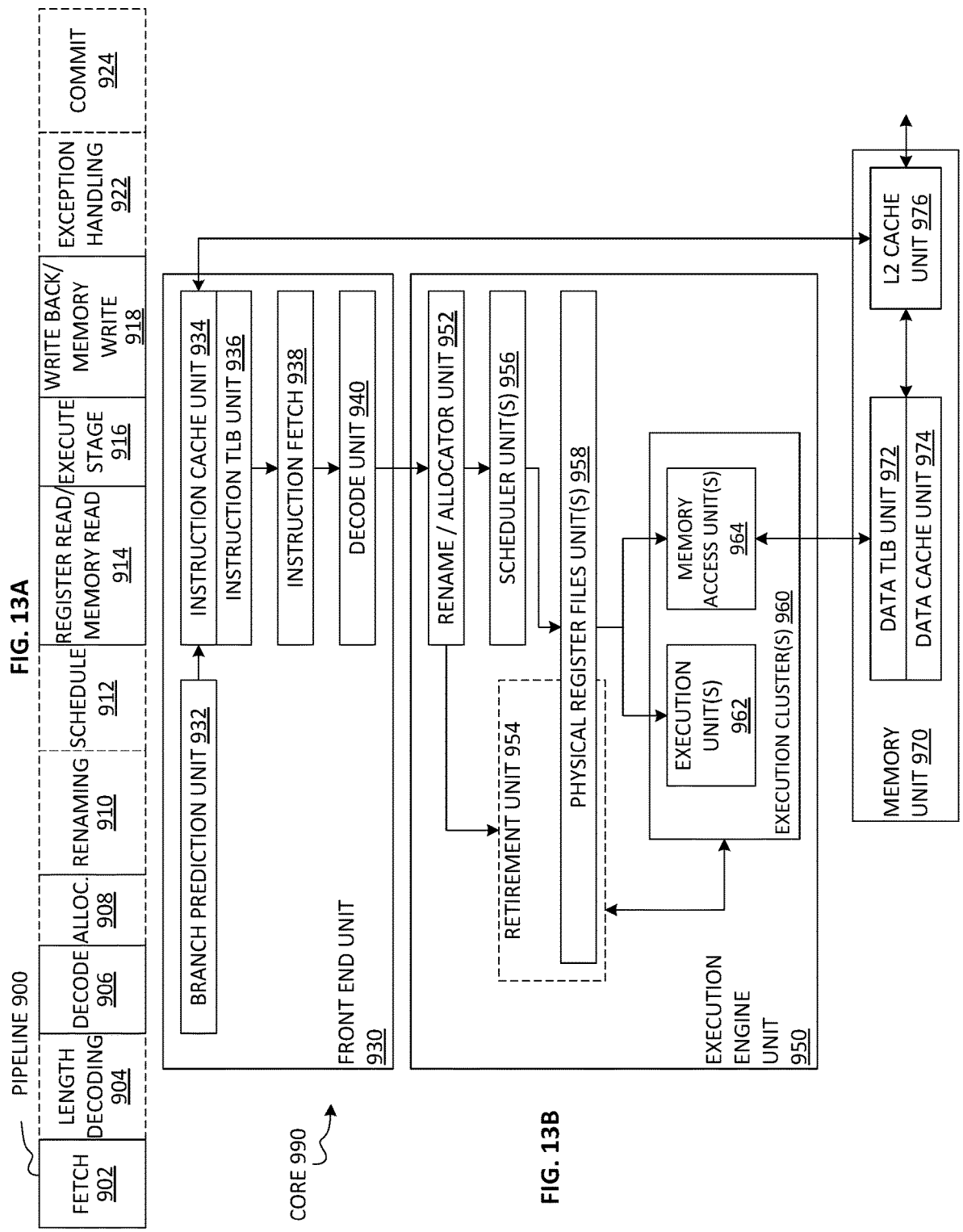

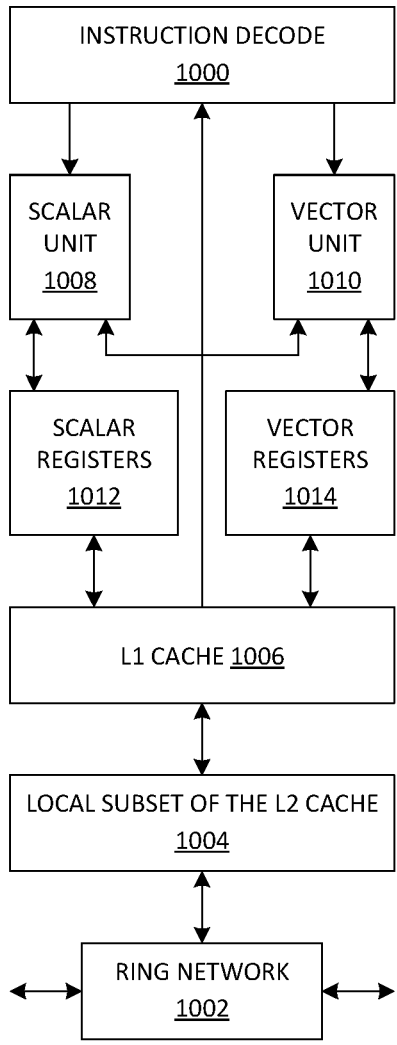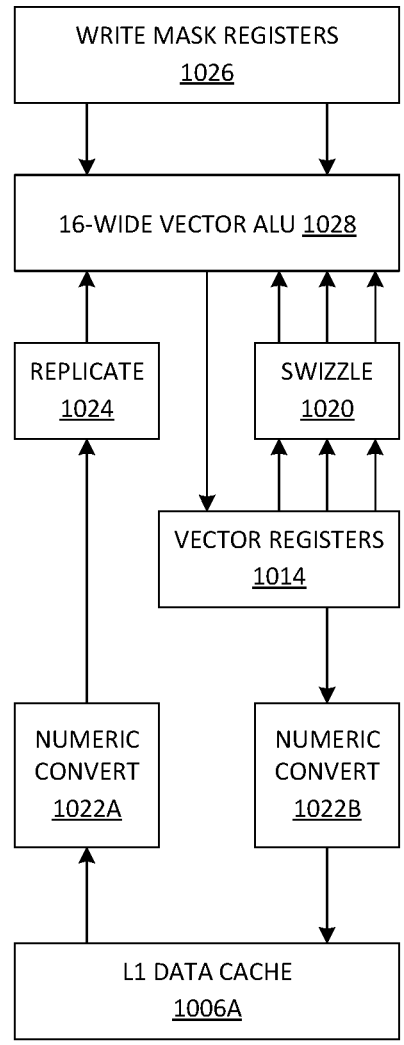
FIG. 14A
FIG. 14B

DYNAMIC INCLUSIVE LAST LEVEL CACHE

BACKGROUND

1. Technical Field

This disclosure generally relates to processor technology, and processor cache technology.

2. Background Art

For an integrated circuit chip/package that includes a processor, a last level cache (LLC) may refer to a highest-level cache that may be shared by all the functional units in the same chip/package with the LLC. LLC cache can be classified based on whether the inclusion policy is inclusive, exclusive, or non-inclusive. If all the blocks that are present in the core caches (e.g., mid-level cache (MLC) and first-level (L1) cache) are also present in the LLC, then the LLC is considered inclusive of the core caches. If the LLC only contains blocks that are not present in the core caches, then the LLC is considered exclusive of the core caches. An exclusive LLC policy reduces memory accesses by effectively utilizing a combined capacity of the core caches and the LLC, as compared to an inclusive LLC policy where the capacity of the LLC determines the overall capacity because the blocks are duplicated between the core caches and the LLC.

Exclusive LLC may require additional on-chip bandwidth to support more frequent evictions (e.g., clean as well as modified) from the core caches. For inclusive LLC, the core caches may silently drop a clean eviction from the core caches because a copy of the evicted line already exists in the LLC. A non-inclusive LLC policy (sometimes also referred to as non-inclusive non-exclusive (NINE)) does not enforce either inclusion or exclusion. For example, the LLC may contain blocks from the core caches but the non-inclusive LLC policy does not provide any guarantee on the data duplication between the two.

BRIEF DESCRIPTION OF THE DRAWINGS

The various embodiments of the present invention are illustrated by way of example, and not by way of limitation, in the figures of the accompanying drawings and in which:

FIG. 13A is a block diagram illustrating both an exemplary in-order pipeline and an exemplary register renaming, out-of-order issue/execution pipeline according to embodiments of the invention.

FIG. 13B is a block diagram illustrating both an exemplary embodiment of an in-order architecture core and an exemplary register renaming, out-of-order issue/execution architecture core to be included in a processor according to embodiments of the invention;

FIGS. 14A-B illustrate a block diagram of a more specific exemplary in-order core architecture, which core would be one of several logic blocks (including other cores of the same type and/or different types) in a chip;

DETAILED DESCRIPTION

Figure 1:
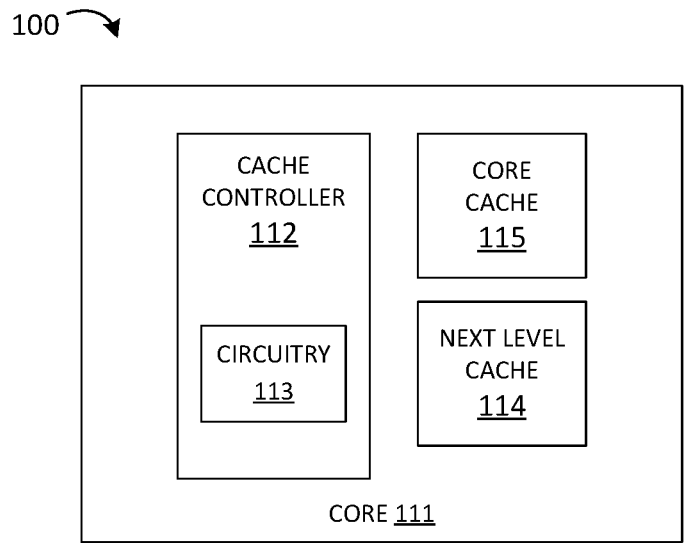
FIG. 1 is a block diagram of an example of an integrated circuit according to an embodiment.

Embodiments discussed herein variously provide techniques and mechanisms for controlling a processor cache. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to control or utilize a processor cache.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Dynamic Inclusion Cache Policy Examples

Some embodiments provide technology for a dynamic inclusive LLC (DIL). As noted above, exclusive LLC provides additional capacity over inclusive LLC at the cost of additional data transfer from the MLC to the LLC for the MLC clean evictions and additional power consumption. Workloads with a majority of the working set (e.g., amount of data accessed in a given time window) that fits within the capacity of the LLC show higher power consumption under the exclusive LLC policy as compared to the inclusive LLC policy. In order to ensure that the LLC stays as a point of coherence, each time the MLC sends an eviction, the MLC needs to enquire the first level cache (L1) to find out if the line exists in the first level cache. Such backward enquiry from the MLC to the first level cache for every MLC eviction adds an additional pressure on the MLC controller bandwidth. Workloads that may already be bottlenecked by the LLC read bandwidth get an additional bottleneck from the MLC clean eviction bandwidth, as compared to inclusive LLC. Using inclusive LLC always retains a copy of the line in LLC and notifies the core to drop the clean evictions. Inclusive LLC, however, removes the additive capacity of the LLC and the MLC from the exclusive LLC policy and may cause performance loss for workloads sensitive to the additional combined capacity of the MLC and the LLC.

Some embodiments may advantageously provide technology for dynamic inclusivity for LLC to gain benefits of both the inclusive LLC (e.g., low data transfer between the MLC and the LLC and no penalty of doing L1 backward enquire on each MLC eviction) and the exclusive LLC (e.g., combined capacity of the MLC and the LLC). Some embodiments of DIL may provide technology to identify workloads that get a high re-use from the LLC, to send a shared copy of the data to the core and, at the same time, maintain a copy of the data in the LLC. When the MLC needs to evict the data from the cache, the MLC may silently drop the data to be evicted because the data has a shared copy and the LLC already holds the data. The shared copy maintained in the LLC avoids the additional data transfer from the MLC to the LLC and thereby saves power. The shared copy maintained in the LLC also saves the effort of back invalidating L1 for every MLC clean eviction and improves the second level cache (L2) throughput significantly for workloads showing significant re-use from the LLC.

Advantageously, embodiments of DIL may improve a LLC peak bandwidth significantly by reducing or eliminating the need of snooping L1 for each MLC eviction. Embodiments of DIL may also improve the LLC power and according the package power significantly, which may lead to processors with better performance and throughput characteristics.

With reference to FIG. 1, an embodiment of an integrated circuit 100 may include a core 111, and a cache controller 112 coupled to the core 111. The cache controller 112 may include circuitry 113 to identify data from a working set for dynamic inclusion in a next level cache 114 based on an amount of re-use of the next level cache 114, send a shared copy of the identified data to a requesting core of one or more processor cores, and maintain a copy of the identified data in the next level cache 114. For example, the circuitry 113 may be configured to determine dynamic inclusion of data in the next level cache 114 on a per data line basis. In some embodiments, the circuitry 113 may be further configured to silently drop data to be evicted from a core cache 115 if the data to be evicted from the core cache 115 has a shared copy of the data in the next level cache 114. For example, the next level cache 114 may comprise a non-inclusive LLC.

In some embodiments, the circuitry 113 may be further configured to increment a counter value when a hit in the next level cache 114 corresponds to an eviction from a core cache 115, and identify a current data hit in the next level cache 114 for dynamic inclusion in the next level cache 114 if the current data hit corresponds to an eviction from the core cache 115 and if the counter value is greater than a threshold. For example, the circuitry 113 may also be configured to set a snoop filter to indicate that the requesting core is valid for the current data hit. In some embodiments, if the current data hit does not correspond to an eviction from the core cache or if the counter value is not greater than the threshold, the circuitry 113 may be further configured to send an exclusive copy of the data to the requesting core, update an entry in the snoop filter to indicate a core identifier of the requesting core, and deallocate the data in the next level cache 114.

Figure 19:
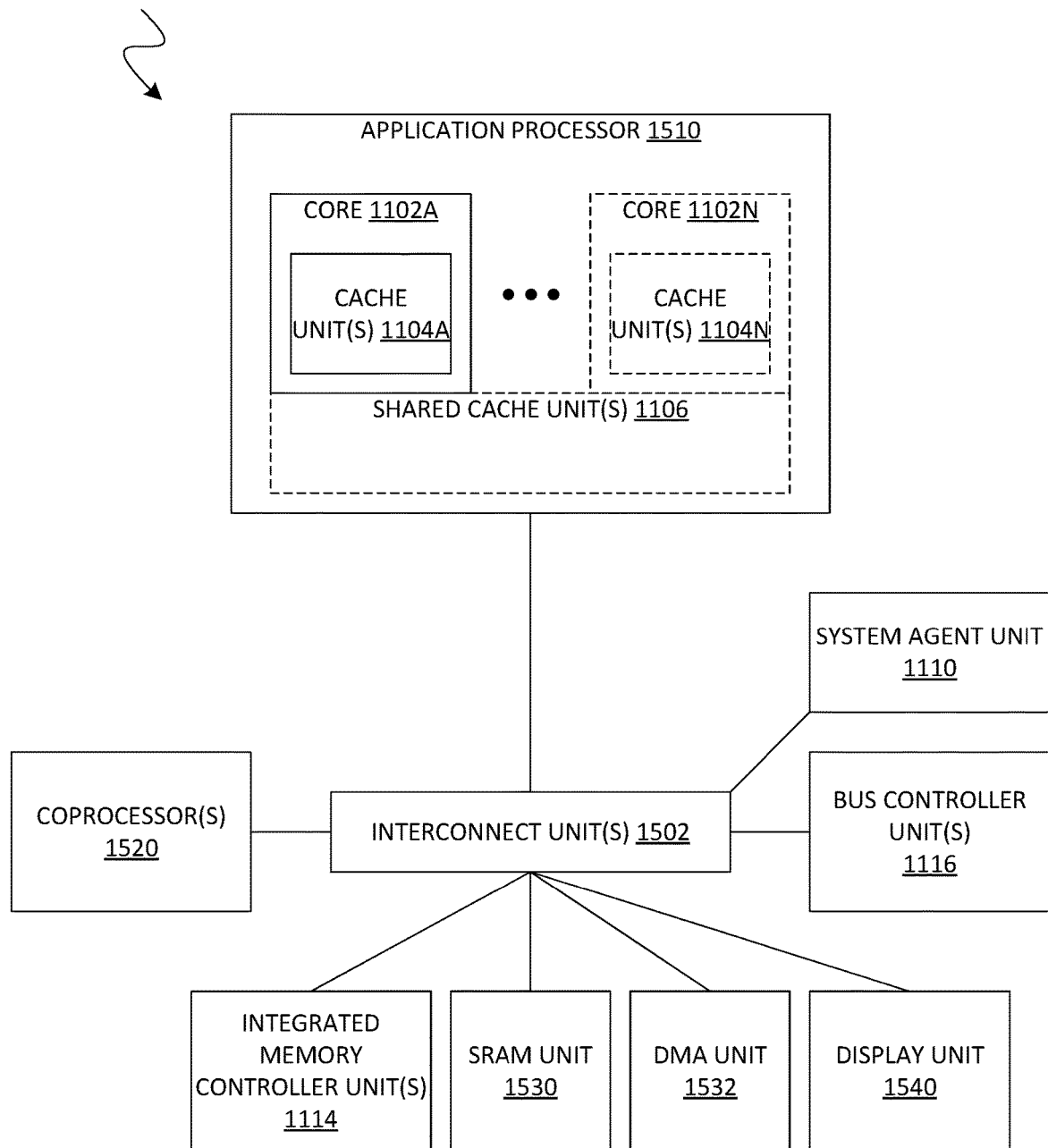
Figure 20:
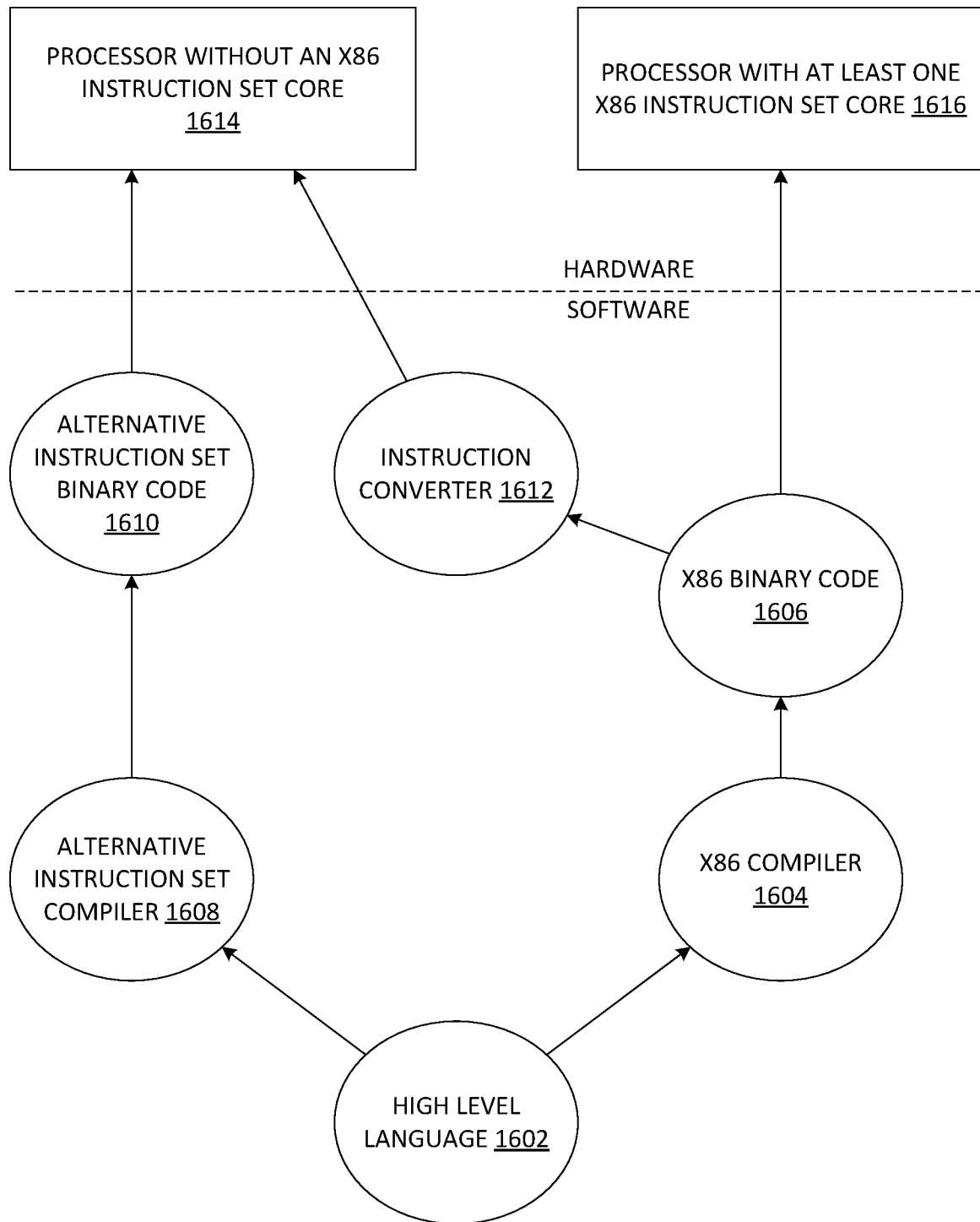
FIG. 20 is a block diagram contrasting the use of a software instruction converter to convert binary instructions in a source instruction set to binary instructions in a target instruction set according to embodiments of the invention.

Embodiments of the cache controller 112, circuitry 113, next level cache 114, and/or core cache 115 may be incorporated in a processor including, for example, the core 990 (FIG. 13B), the cores 1102A-N (FIGS. 15, 19), the processor 1210 (FIG. 16), the co-processor 1245 (FIG. 16), the processor 1370 (FIGS. 17-18), the processor/coprocessor 1380 (FIGS. 17-18), the coprocessor 1338 (FIGS. 17-18), the coprocessor 1520 (FIG. 19), and/or the processors 1614, 1616 (FIG. 20).

Figure 2A:
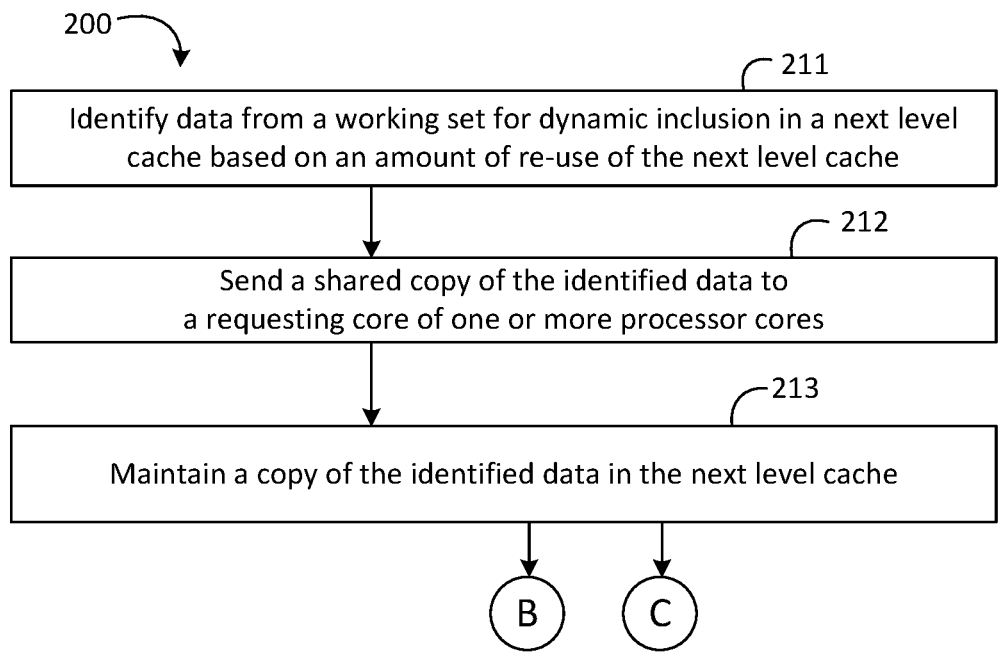
FIGS. 2A to 2C are flow diagrams of an example of a method of controlling a cache according to an embodiment.
Figure 2B:
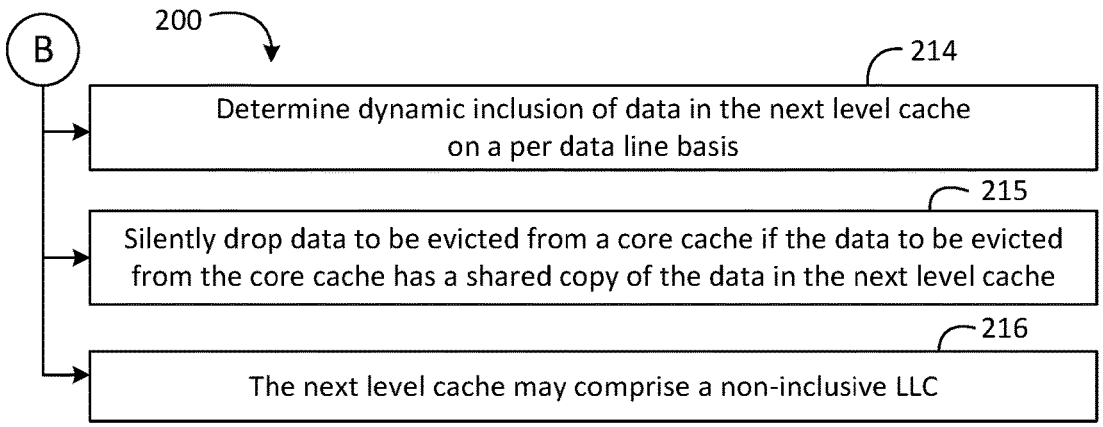
Figure 2C:
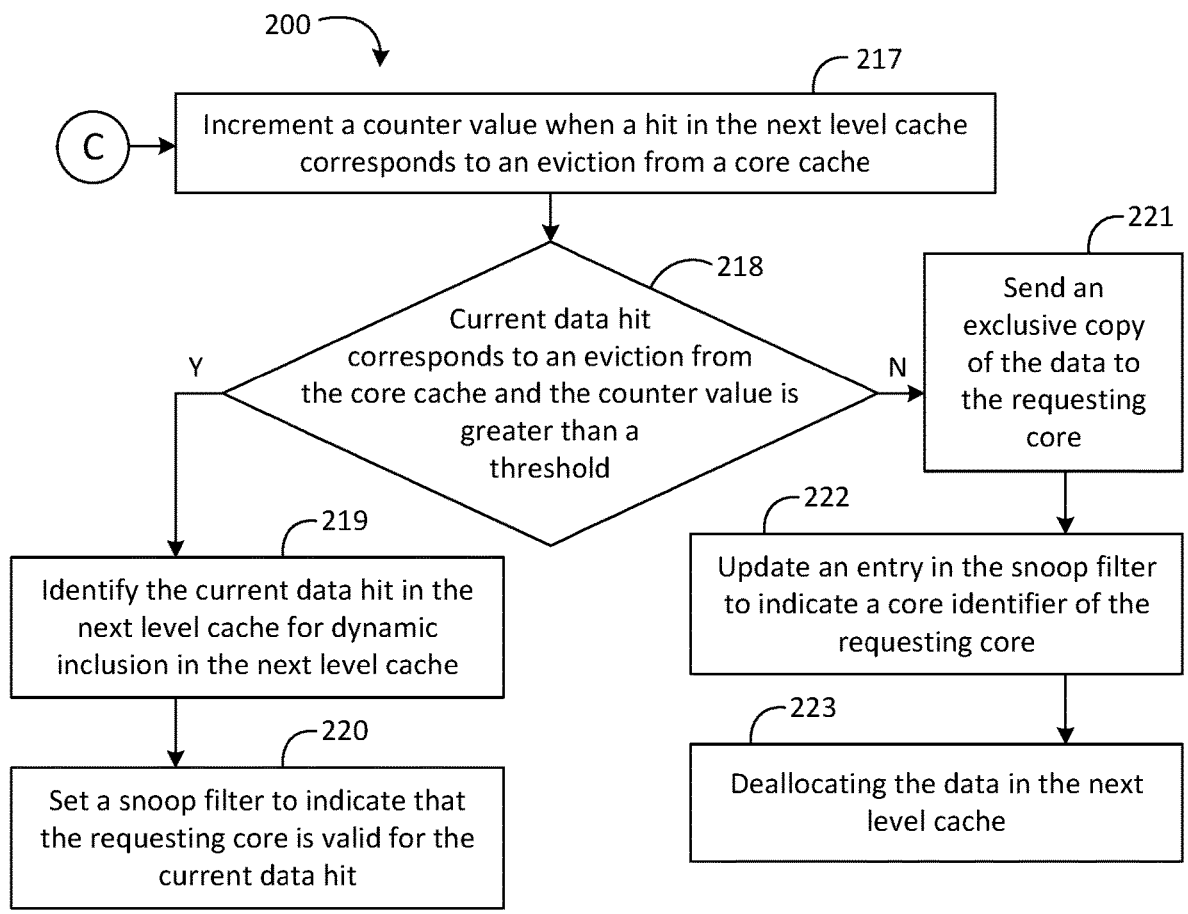

With reference to FIGS. 2A to 2C, an embodiment of a method 200 of controlling a cache may include identifying data from a working set for dynamic inclusion in a next level cache based on an amount of re-use of the next level cache at box 211, sending a shared copy of the identified data to a requesting core of one or more processor cores at box 212, and maintaining a copy of the identified data in the next level cache at box 213. For example, the method 200 may include determining dynamic inclusion of data in the next level cache on a per data line basis at box 214. Some embodiments of the method 200 may further include silently dropping data to be evicted from a core cache if the data to be evicted from the core cache has a shared copy of the data in the next level cache at box 215. For example, the next level cache may comprise a non-inclusive LLC at box 216.

Some embodiments of the method 200 may further include incrementing a counter value when a hit in the next level cache corresponds to an eviction from a core cache at box 217, and, if a current data hit corresponds to an eviction from the core cache and if the counter value is greater than a threshold at box 218, identifying the current data hit in the next level cache for dynamic inclusion in the next level cache at box 219. The method 200 may also include setting a snoop filter to indicate that the requesting core is valid for the current data hit at box 220. In some embodiments, if the current data hit does not correspond to an eviction from the core cache or if the counter value is not greater than the threshold at box 218, the method 200 may further include sending an exclusive copy of the data to the requesting core at box 221, updating an entry in the snoop filter to indicate a core identifier of the requesting core at box 222, and deallocating the data in the next level cache at box 223.

Figure 3:
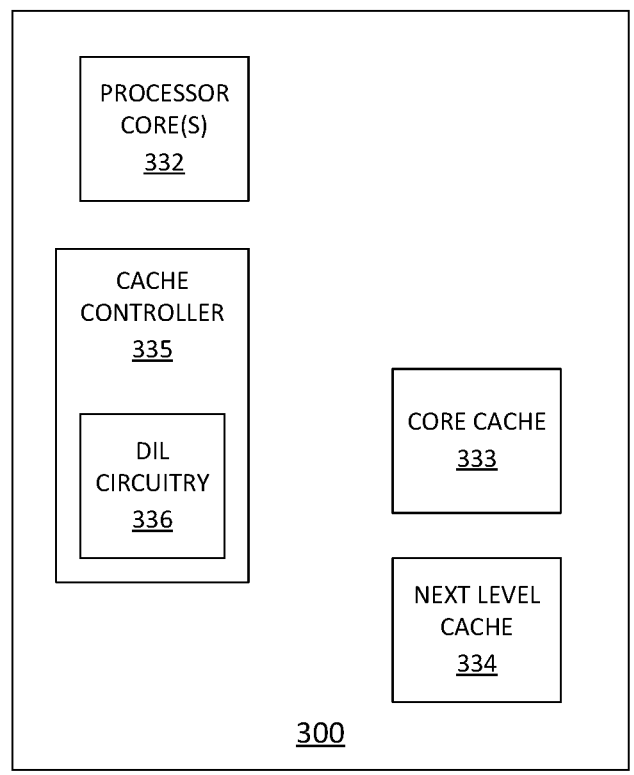
FIG. 3 is a block diagram of an example of an apparatus according to an embodiment.

With reference to FIG. 3, an embodiment of an apparatus 300 may include one or more processor cores 332, a core cache 333 co-located with and communicatively coupled to the one or more processor cores 332, a next level cache 334 co-located with and communicatively coupled to the core cache 333 and the one or more processor cores 332, and a cache controller 335 co-located with and communicatively coupled to the core cache 333, the next level cache 334, and the one or more processor cores 332. Any suitable technology may be utilized for the connections between the components of the apparatus 300 including, for example, bus, ring, other fabric, etc. The cache controller 335 may include DIL circuitry 336. The circuitry 336 may be configured to identify data from a working set for dynamic inclusion in the next level cache 334 based on an amount of re-use of the next level cache 334, send a shared copy of the identified data to a requesting core of the one or more processor cores 332, and maintain a copy of the identified data in the next level cache 334. For example, the circuitry 336 may be configured to determine dynamic inclusion of data in the next level cache 334 on a per data line basis. In some embodiments, the circuitry 336 may be further configured to silently drop data to be evicted from the core cache 333 if the data to be evicted from the core cache 333 has a shared copy of the data in the next level cache 334. For example, the next level cache 334 may comprise a non-inclusive LLC.

In some embodiments of the apparatus 300, the circuitry 336 may be further configured to increment a counter value when a hit in the next level cache 334 corresponds to an eviction from the core cache 333, and identify a current data hit in the next level cache 334 for dynamic inclusion in the next level cache 334 if the current data hit corresponds to an eviction from the core cache 333 and if the counter value is greater than a threshold. The circuitry 336 may also be configured to set a snoop filter to indicate that the requesting core is valid for the current data hit. In some embodiments, if the current data hit does not correspond to an eviction from the core cache 333 or if the counter value is not greater than the threshold, the circuitry 336 may be further configured to send an exclusive copy of the data to the requesting core, update an entry in the snoop filter to indicate a core identifier of the requesting core, and deallocate the data in the next level cache 334.

Embodiments of the cache controller 335, DIL circuitry 336, next level cache 334, and/or core cache 333 may be integrated with processors including, for example, the core 990 (FIG. 13B), the cores 1102A-N (FIGS. 15, 19), the processor 1210 (FIG. 16), the co-processor 1245 (FIG. 16), the processor 1370 (FIGS. 17-18), the processor/coprocessor 1380 (FIGS. 17-18), the coprocessor 1338 (FIGS. 17-18), the coprocessor 1520 (FIG. 19), and/or the processors 1614, 1616 (FIG. 20).

As noted above, for an exclusive LLC, each MLC clean eviction needs to send the data to the LLC because the block was present only in the MLC. This additional data transfer causes additional power consumption in the chip/package (e.g., an SoC package) as compared to the inclusive LLC. The non-inclusive LLC on the other hand, provides no guarantees on the data duplication between the core caches and the LLC. A non-inclusive LLC may be configured to insert blocks into either the MLC, or the LLC, or both. A conventional non-inclusive LLC may provide the following process flows: A) for a read LLC miss, the data is installed only in the MLC; B) for a read LLC hit, the line is deallocated from the LLC and allocated in the MLC; and C) the MLC sends both clean and modified evictions to LLC.

A non-inclusive LLC may also include a snoop filter (SF) which behaves as an inclusive LLC but without any data storage. The SF enables the LLC to provide coherence without additional snoop overhead. In some conventional non-inclusive LLCs, for example, any miss in the LLC does not guarantee that any core does not have the line and the cache controller need a snoop to all the cores. The SF avoids these broadcast snoops by maintaining the tags of all the lines that are present in all the cores. Because the SF does not have any data storage, the SF may be a light weight circuit in terms of the area and power consumption. Some processor chips/packages may utilize a common tag storage for both the SF and the LLC data. For example, each tag entry may contain the following major information: a) a core valid field (e.g., that indicates which core caches may have the line); b) a data valid field (e.g., that indicates if the LLC contains the data); and c) a state field (e.g., that indicates a state of the cache line either in MLC or LLC with respect to DRAM).

One example reason that a core demand read request in the non-inclusive LLC hits in the LLC is because the data line was first issued as an LLC pre-fetch and later the core demand read got a hit to the pre-fetched data in the LLC. In this scenario, the LLC acts as a pre-fetch buffer and hides the memory latency but does not save on the memory access for the given data line. Another example reason that a core demand read request in the non-inclusive LLC hits in the LLC is when the core demand read request gets a hit to a previous MLC eviction from either the same core or a different core and the LLC acts as a victim cache. For this scenario, the LLC provides the re-use of the data line and accordingly saves the memory access. The cache controller may maintain a counter referred to as the LLC hit counter (LHC) which captures this re-use from the LLC and is incremented on every LLC hit to an earlier MLC eviction in the LLC. A high value of the LHC may indicate that the working set of the application fits within the LLC. Accordingly, a high value of LHC may indicate that an inclusive LLC might perform better for that working set because the inclusive LLC may provide at least the following benefits: a) the MLC need not snoop L1 on every clean eviction, improving MLC controller bandwidth; and b) the clean eviction is dropped from the MLC, saving on the write bandwidth from the MLC to the LLC.

Figure 4:
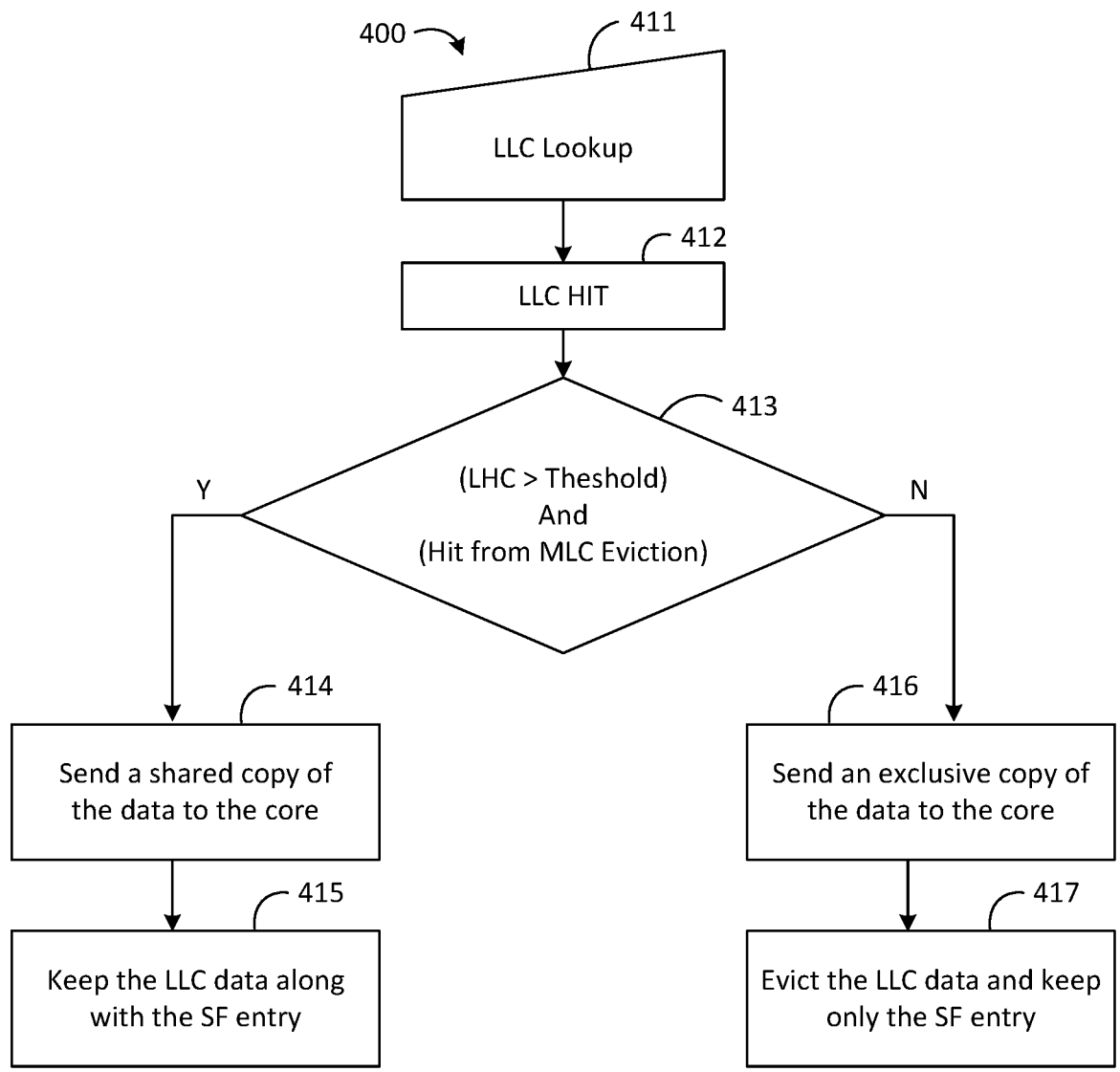
FIG. 4 is a flow diagram of an example of a process flow according to an embodiment.

With reference to FIG. 4, an embodiment of a process flow 400 shows an example of a core demand read request flow in a non-inclusive LLC with DIL. At box 411, a LLC lookup determines if the line is present in the LLC. Conventionally, if the line is present in the LLC, an exclusive copy of the data is sent to the requesting core, the SF entry is updated with the core id of the requesting core in the core valid field, and the data entry is deallocated. In accordance with some embodiment of DIL, when there is a LLC hit at box 412, the cache controller may then determine whether the data was brought into the LLC by an earlier MLC Eviction and whether the LHC value is greater than a threshold at box 413. When both the above conditions are met at box 413, indicating a high re-use probability from the LLC of the given line, the cache controller then sends a shared copy of the line to the core at box 414 and the cache controller keeps the LLC data along with the SF entry at box 415 (e.g., the LLC data entry is not deallocated). The SF may then be populated with the core valid bit of the requesting core. If the two conditions are not met at box 413, the cache controller may proceed to send an exclusive copy of the data to the core at box 416, and evict the LLC data and keep only the SF entry at box 417.

Figure 5:
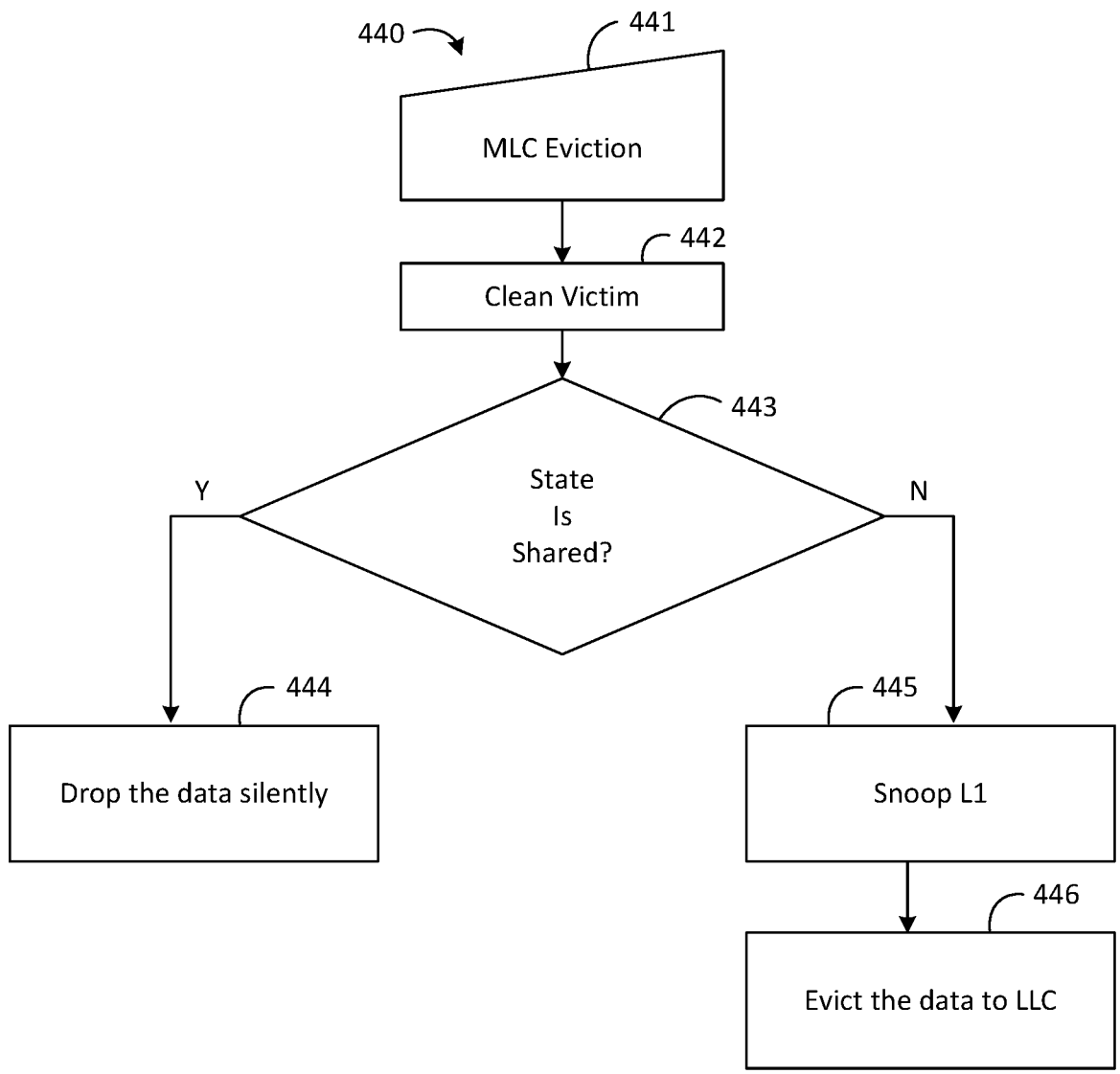
FIG. 5 is a flow diagram of another example of a process flow according to an embodiment.

With reference to FIG. 5, an embodiment of a process flow 440 shows an example of a MLC Eviction flow for a clean victim. For a conventional non-inclusive LLC, when the victim is exclusive, the core needs to send the copy of the data back to the LLC. In the conventional process, the core valid entry of the SF entry is cleared as well. Accordingly, the MLC eviction must snoop the L1 to check if the line is present in the L1. When the line is not present in L1 (common case), the clean eviction is sent back to the LLC which populates the LLC data entry and clears the core valid bit. In a conventional corner case when the line is present in L1, only the data entry in LLC is populated but the core valid bit is not cleared.

In the process flow 400, however, the LLC sends a shared copy of the line to the MLC when the application working set fits in LLC. At MLC eviction at box 441, for a clean victim at box 442, the cache controller may determine if the state of the clean victim is shared at box 443. If so, because the clean victim is a shared copy and the LLC already has a copy of the data, the MLC drops the data silently at box 444. Dropping the data silently saves both in the data transfer from MLC and LLC and also saves the L1 snoop, as compared to the conventional MLC eviction for a non-inclusive LLC. If the state is not shared at box 443, the cache controller may proceed to snoop L1 at box 445 and evict the data to LLC at box 446.

Figure 6:
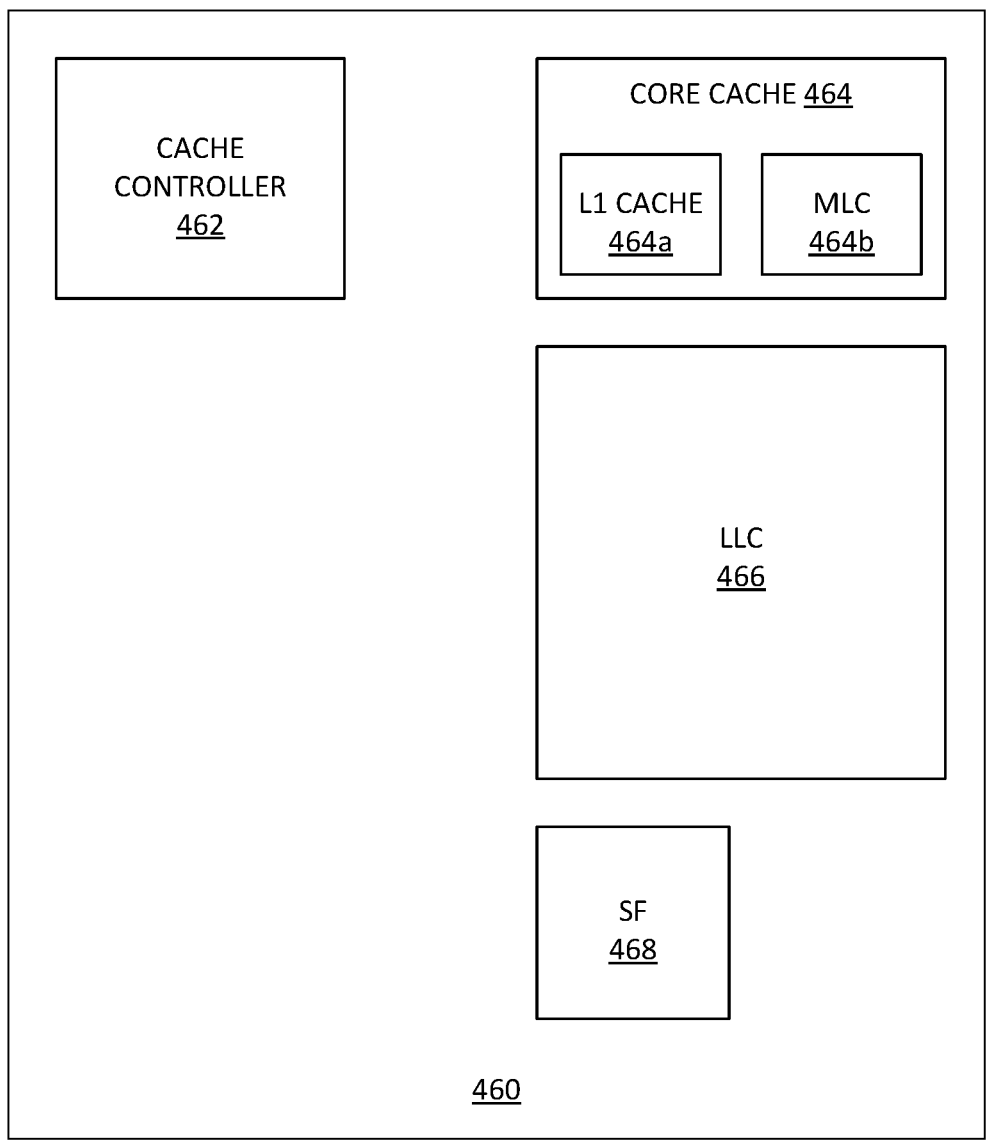
FIG. 6 is a block diagram of an example of a cache system according to an embodiment.

In terms of design complexity, there is no change needed in the core because the inclusivity is facilitated by sending a shared copy of the line to the core and the information of whether LLC is behaving as inclusive or exclusive is not propagated to the MLC. Embodiments also advantageously avoid any transition overhead between inclusive and exclusive behavior. In some embodiments, the cache controller for the LLC may determine the inclusivity per data line and accordingly there is no need for synchronization across MLC and LLC. If the core needs to modify the data, however, the core needs an exclusive copy, which incurs an additional request from MLC to the LLC. Performance modeling of an embodiment of DIL on a variety of standard micro-benchmarks which measures LLC bandwidth showed better LLC peak bandwidth for different read-write mixes on a single core and multi-core applications, and better write bandwidth and instructions per cycle (IPC) for multi-thread applications, versus a baseline non-inclusive LLC without DIL With reference to FIG. 6, an embodiment of a cache system 460 includes a cache controller 462 communicatively coupled to a core cache 464, a LLC 466, and a SF 468. The core cache 464 includes a L1 cache 464a and a MLC 464b. The cache controller 462 maintains a LHC which is incremented on every LLC hit to an earlier MLC eviction in the LLC 466. The cache controller 462 is configured with DIL technology to handle a core demand read for a data line as follows. The cache controller 462 performs a LLC lookup to determine if the data line is present in the LLC 466. If there is a hit in the LLC 466, the cache controller 462 then determines whether the data was brought into the LLC 466 by an earlier eviction from the MLC 464b and whether the LHC value is greater than a threshold, indicating a high re-use probability of the data line from the LLC 466. If both conditions are met, the cache controller 462 then sends a shared copy of the data line to the core, the cache controller 462 keeps the data line in the LLC 466, and also keeps the corresponding entry in the SF 468 (e.g., the LLC data entry is not deallocated). The SF 468 is then populated with the core valid bit of the requesting core. If the two conditions are not met, the cache controller 462 proceeds to send an exclusive copy of the data to the core, evict the data line from the LLC 466, and keep only the corresponding entry in the SF 468.

Some embodiments of the cache controller 462 are further configured with DIL technology to handle an eviction from the MLC 464b for a clean victim as follows. The cache controller determines if the state of the clean victim is shared and, if so, the cache controller silently drops the data from the MLC 464b (e.g., because the clean victim is a shared copy and the LLC 466 already has a copy of the data). Dropping the data silently saves both in the data transfer from the MLC 464b and the LLC 466 and also saves a snoop of the L1 cache 464a, as compared to the conventional MLC eviction for a non-inclusive LLC. If the state of the clean victim is not shared, the cache controller 462 proceed to snoop the L1 cache 464a (e.g., updating the corresponding entry in the SF 468) and evict the data to the LLC 466.

Single Re-Use Cache Policy Examples

Some embodiments provide technology to apply or enforce a single re-use cache policy. For exclusive LLC, the LLC may be used as a victim cache where all the MLC evictions are copied back to the LLC with the expectation of getting re-used from the LLC in the future. However, not all the MLC evictions have equal probability of getting re-used from the LLC. Some systems may utilize dead block prediction (DBP) techniques to bypass some of the MLC evictions to prevent LLC thrashing and provide improved or optimal LLC re-use. Conventional DBP techniques for exclusive LLC, however, may not effectively capture single re-use data from the LLC (e.g., data read from the main memory for the first time and then re-used a second time), which may result in a lower LLC hit rate and lower performance. For example, an exclusive LLC with DBP may not capture the single re-use of a buffer even if the buffer capacity is smaller than the LLC size.

Some embodiments may provide technology for a single re-use policy (SRP), where a specific class of MLC evictions (e.g., with the source as the main memory) may be given a second chance to stay in LLC based on overall LLC re-use. Advantageously, some embodiments of SRP technology may significantly improve the LLC hit rate of certain applications, thereby reducing the main memory access.

Figure 7:
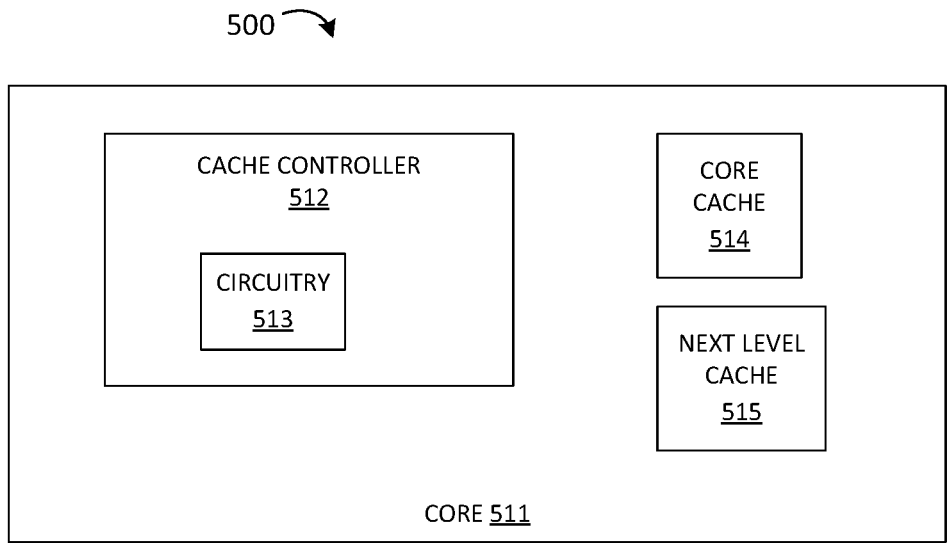
FIG. 7 is a block diagram of another example of an integrated circuit according to an embodiment.

With reference to FIG. 7, an embodiment of an integrated circuit 500 may include a core 511, and a cache controller 512 coupled to the core 511. The cache controller 512 may include circuitry 513 to identify single re-use data evicted from a core cache 514, and retain the identified single re-use data in a next level cache 515 based on an overall re-use of the next level cache 515. For example, a source of the single re-use data may be main memory. In some embodiments, the circuitry 513 may be configured to determine a use count for a data line based on a number of core cache 514 hits experienced by the data line when the data line is resident in the core cache 514, determine a trip count for the data line based on a number of trips made by the data line between the core cache 514 and the next level cache 515 from when the data line is brought into one or more of the core cache 514 and the next level cache 515 until the data line is evicted from the next level cache 515, and identify the single re-use data based on a use count of one and trip count of zero.

In some embodiments, the circuitry 513 may be further configured to increment a counter value when a hit in the next level cache corresponds to an eviction from the core cache. The circuitry 513 may also be configured to evict a data line from the core cache 514, mark the evicted data line as dead, and install the evicted data line marked as dead as a most recently used (MRU) data line in the next level cache 515 if the counter value is greater than a threshold and if a source of the data line is main memory. In some embodiments, if the counter value is not greater than the threshold or if a source of the data line is not main memory, the circuitry 513 may be configured to install the evicted data line marked as dead as a least recently used (LRU) data line in the next level cache 515, if an invalid block is available in the next level cache 515, or to bypass the next level cache 515, if an invalid block is not available in the next level cache 515. For example, the next level cache 515 may comprise a LLC.

Embodiments of the cache controller 512, circuitry 513, next level cache 515, and/or core cache 514 may be incorporated in a processor including, for example, the core 990 (FIG. 13B), the cores 1102A-N (FIGS. 15, 19), the processor 1210 (FIG. 16), the co-processor 1245 (FIG. 16), the processor 1370 (FIGS. 17-18), the processor/coprocessor 1380 (FIGS. 17-18), the coprocessor 1338 (FIGS. 17-18), the coprocessor 1520 (FIG. 19), and/or the processors 1614, 1616 (FIG. 20).

Figure 8A:
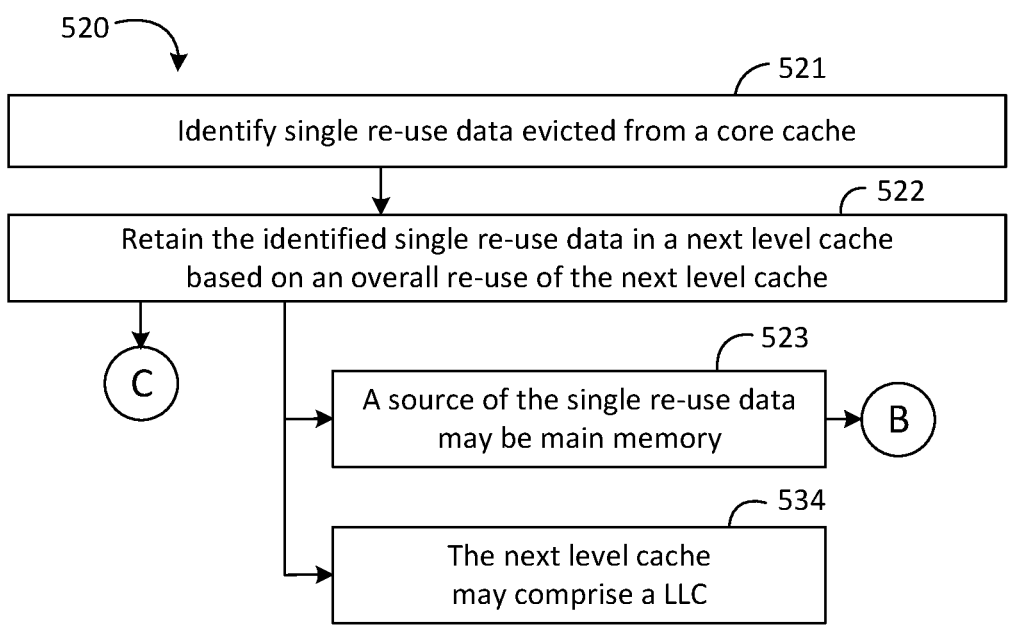
FIGS. 8A to 8C are flow diagrams of another example of a method of controlling a cache according to an embodiment.
Figure 8B:
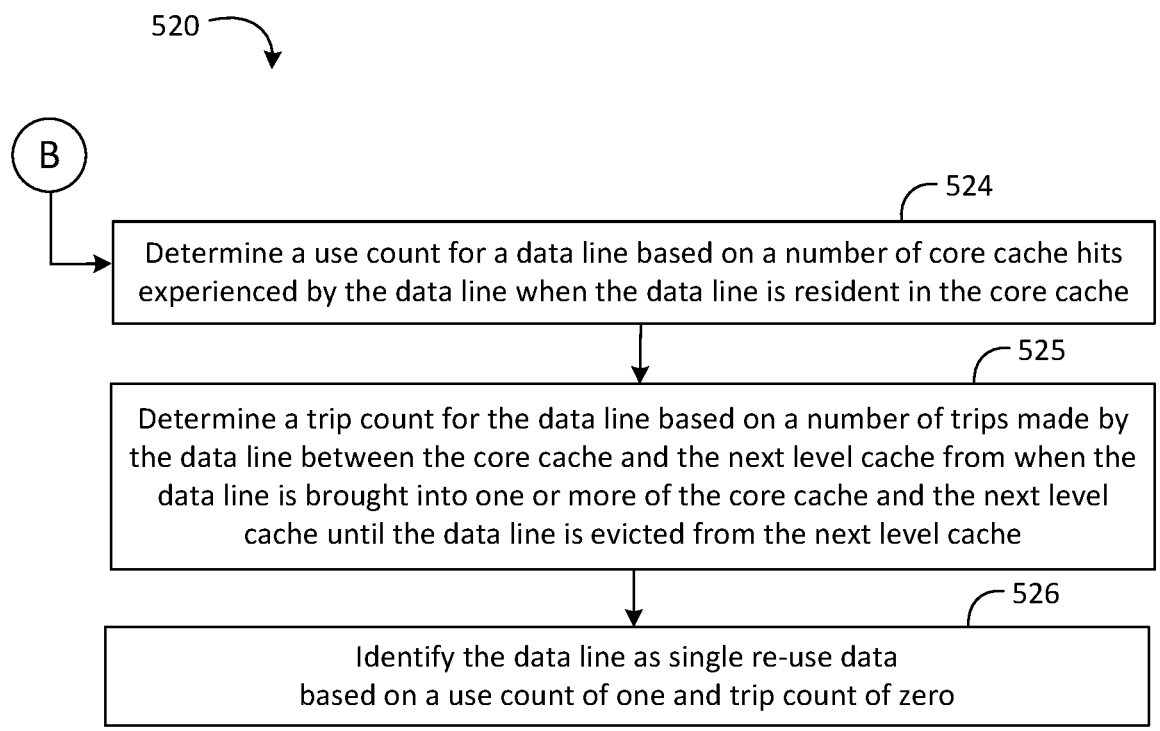
Figure 8C:
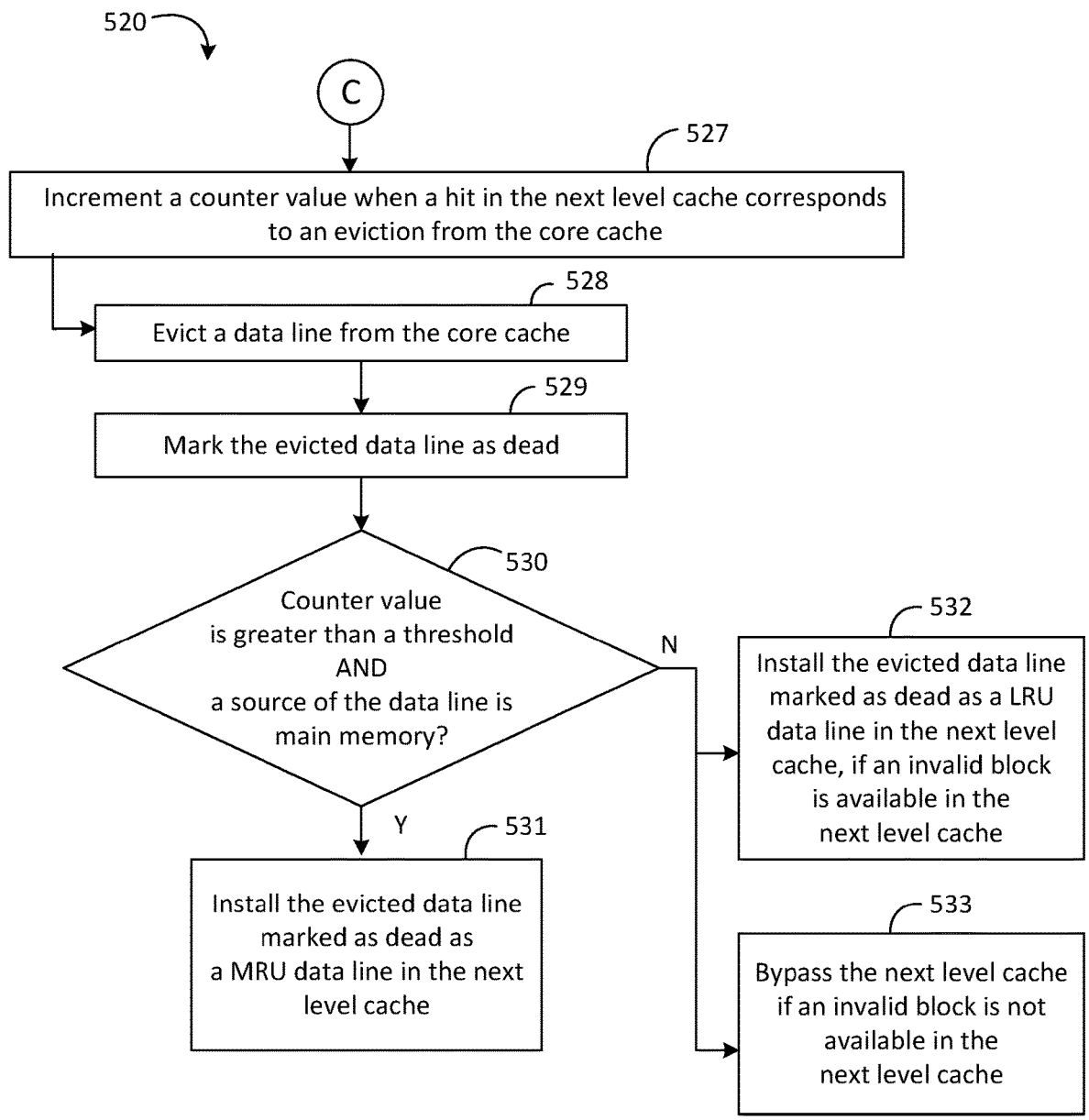

With reference to FIGS. 8A to 8C, an embodiment of a method 520 of controlling a cache may include identifying single re-use data evicted from a core cache at box 521, and retaining the identified single re-use data in a next level cache based on an overall re-use of the next level cache at box 522. For example, a source of the single re-use data may be main memory at box 523. Some embodiments of the method 520 may further include determining a use count for a data line based on a number of core cache hits experienced by the data line when the data line is resident in the core cache at box 524, determining a trip count for the data line based on a number of trips made by the data line between the core cache and the next level cache from when the data line is brought into one or more of the core cache and the next level cache until the data line is evicted from the next level cache at box 525, and identifying the data line as single re-use data based on a use count of one and trip count of zero at box 526.

Some embodiments of the method 520 may further include incrementing a counter value when a hit in the next level cache corresponds to an eviction from the core cache at box 527. The method 520 may also include evicting a data line from the core cache at box 528, marking the evicted data line as dead at box 529, and, if the counter value is greater than a threshold and if a source of the data line is main memory at box 530, installing the evicted data line marked as dead as a MRU data line in the next level cache at box 531. In some embodiments, if the counter value is not greater than the threshold or if a source of the data line is not main memory at box 530, the method 520 may further include installing the evicted data line marked as dead as a LRU data line in the next level cache at box 532 if an invalid block is available in the next level cache, or bypassing the next level cache at box 533 if an invalid block is not available in the next level cache. For example, the next level cache may comprise a LLC at box 534.

Figure 9:
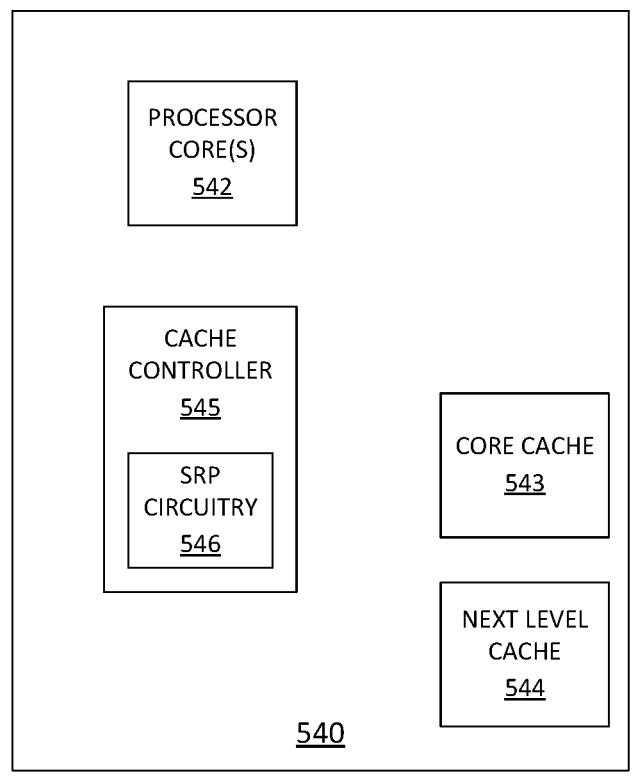
FIG. 9 is a block diagram of an example of another apparatus according to an embodiment.

With reference to FIG. 9, an embodiment of an apparatus 540 may include one or more processor cores 542, a core cache 543 co-located with and communicatively coupled to the one or more processor cores 542, a next level cache 544 co-located with and communicatively coupled to the core cache 543 and the one or more processor cores 542, and a cache controller co-located with and communicatively coupled to the core cache 543, the next level cache 544, and the one or more processor cores 542. The cache controller 545 may include SRP circuitry 546. The circuitry 546 may be configured to identify single re-use data evicted from the core cache 543, and retain the identified single re-use data in the next level cache 544 based on an overall re-use of the next level cache 544. For example, a source of the single re-use data is main memory. In some embodiments, the circuitry 546 may be further configured to determine a use count for a data line based on a number of core cache 543 hits experienced by the data line when the data line is resident in the core cache 543, determine a trip count for the data line based on a number of trips made by the data line between the core cache 543 and the next level cache 544 from when the data line is brought into one or more of the core cache 543 and the next level cache 544 until the data line is evicted from the next level cache 544, and identify the single re-use data based on a use count of one and trip count of zero.

In some embodiments, the circuitry 546 may be configured to increment a counter value when a hit in the next level cache 544 corresponds to an eviction from the core cache 543. The circuitry 546 may also be configured to evict a data line from the core cache 543, mark the evicted data line as dead, and install the evicted data line marked as dead as a most recently used data line in the next level cache 544 if the counter value is greater than a threshold and if a source of the data line is main memory. In some embodiments, if the counter value is not greater than the threshold or if a source of the data line is not main memory, the circuitry 546 may be further configured to install the evicted data line marked as dead as a least recently used data line in the next level cache if an invalid block is available in the next level cache, and to bypass the next level cache if an invalid block is not available in the next level cache. For example, the next level cache 544 may comprise a LLC.

Embodiments of the cache controller 545, SRP circuitry 546, next level cache 544, and/or core cache 543 may be integrated with processors including, for example, the core 990 (FIG. 13B), the cores 1102A-N (FIGS. 15, 19), the processor 1210 (FIG. 16), the co-processor 1245 (FIG. 16), the processor 1370 (FIGS. 17-18), the processor/coprocessor 1380 (FIGS. 17-18), the coprocessor 1338 (FIGS. 17-18), the coprocessor 1520 (FIG. 19), and/or the processors 1614, 1616 (FIG. 20).

Figure 10:
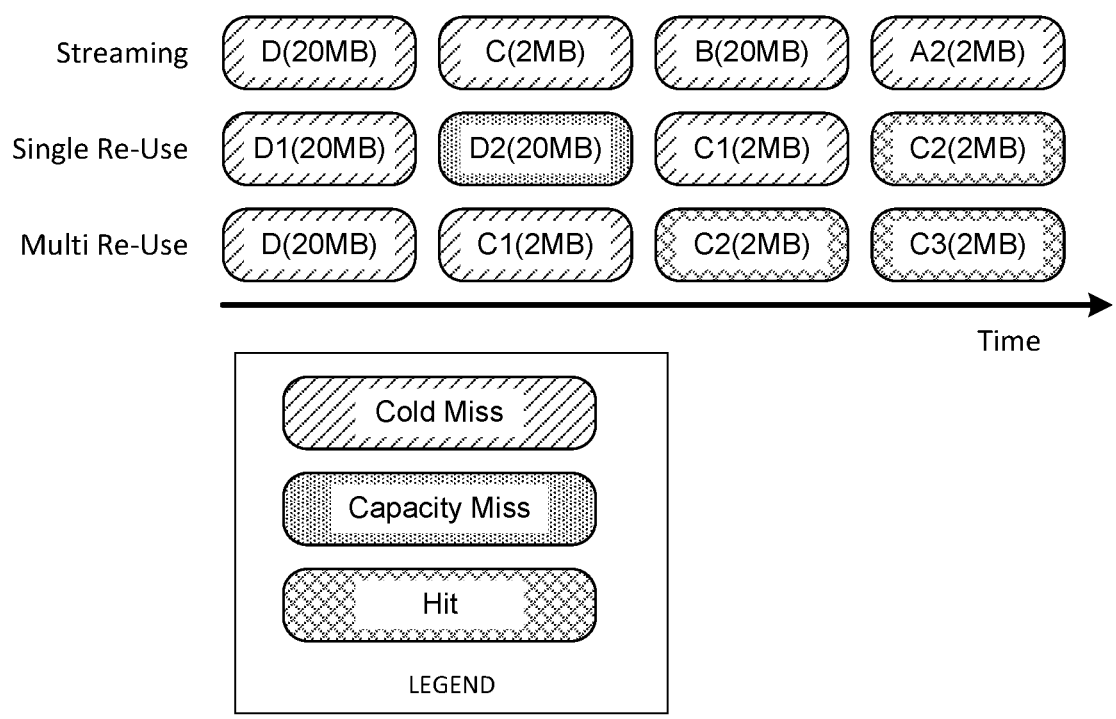
FIG. 10 is an illustrative diagram of example of memory access patterns according to an embodiment.

With reference to FIG. 10, an example diagram illustrates different types of memory access patterns that an application may shows and how LLC provides re-use for each of them. In this example, the MLC capacity is 1.25 MB and the LLC capacity is 12 MB. For a "Streaming" scenario, the core reads a new buffer (D, C, B, A) of different capacity every time from the main memory. All these accesses will be cold misses and the hit rate in the LLC will be zero for any LLC size. Next, FIG. 10 shows a "Single Re-Use" scenario where each buffer is read exactly twice from the main memory. "D1" and "D2" represent two instances of the same buffer "D" and are accessed by the core in the same order from the start of the buffer "D" to the end of the buffer "D". Because the size of the buffer "D" (20 MB) is bigger than the capacity of the LLC (12 MB) in this example, "D1" becomes a cold miss and "D2" becomes a capacity miss. Similarly, "C1" and "C2" goes over the same buffer "C" in the exact same order from the start of the buffer "C" to the end of the buffer "C". Because the buffer capacity of "C" (2 MB) is less than the LLC size (12 MB), the first iteration ("C1") is expected to be a cold miss and the second iteration ("C2") is expected to be an LLC Hit. Next, FIG. 10 shows a "Multi Re-Use" scenario. Here the buffer "C" is accessed three times in terms of "C1", "C2" and "C3" in the same order from the start of the buffer "C" to the end of the buffer "C". C1 will be a cold miss and "C2" and "C3" are expected to be LLC Hits because the capacity of "C" (2 MB) is less than the size of the LLC (12 MB).

The streaming scenarios issue unnecessary insertions (e.g., dead blocks) in the LLC that may waste on-chip bandwidth while not improving performance. Any suitable technology may be utilized to reduce the number of dead blocks in the LLCs. Example technology may include techniques to improve a cache replacement algorithm, techniques to bypass the LLC to save on-chip bandwidth, etc. Other techniques may correlate the instruction or data addresses with the death of a cache block (e.g., by utilizing the dead block either as a replacement or as a prefetch target). Another technique may utilize a virtual victim cache which uses the predicted dead blocks to hold blocks evicted from other sets, where the second reference to the evicted blocks may be satisfied from the dead pool instead of going to the main memory.

Alternatively, other suitable technology to reduce the number of dead blocks in the LLC may include techniques to use dead block identification to bypass the LLC. The core tries to prevent LLC thrashing by bypassing streaming scenarios and keeping the working set which can fit in the LLC. An example bypassing technique performs random bypassing of the cache lines based on a probability which is increased or decreased based on the references to the bypassed lines. This bypassing technique utilizes an additional tag structure to store the tag of the bypassed line and a pointer to the replacement victim which would have been evicted without bypassing. Any suitable technology may be utilized to identify bypass candidates, including re-use-count, re-use-distance, etc.

Because bypassing all requests degrades performance, some cache systems may utilize adaptive bypassing that performs bypass only if no invalid blocks are available in LLC. For exclusive LLC, such systems may include bypass and insertion age techniques. The LLC bypass and age assignment decisions may be based on two properties of the data line when it is considered for allocation in the LLC. The first property is the number of trips (trip count) made by the data line between the MLC and the LLC from the time it is brought into the cache hierarchy till it is evicted from the LLC. The second property is the number of MLC cache hits (use count) experienced by a data line during its residency in the MLC. For each category of use count and trip count (e.g., which may collectively be referred as a dead block prediction (DBP) bin), a DBP module may maintain a LLC hit rate counter for some of the sample sets (e.g., which may be referred to as "observer sets"). For example, sampling may be performed only for the few sets to reduce the overhead of the cache profiling. When there is an MLC eviction belonging to a certain category of the DBP Bin for the non-observer sets (e.g., also referred to as "follower sets"), the DBP module checks the corresponding LLC hit rate counter for this category in the observer set. When the LLC hit rate is less than a configurable threshold, then the DBP module may determine that the probability of this line getting re-used from LLC is lower and may mark the line as "dead" before sending it to the LLC. When the LLC receives a "dead" eviction, the cache controller may insert the line at LRU in the LLC if an invalid block is available in LLC, otherwise the cache controller bypasses the LLC. Inserting the line at LRU ensures that the line becomes a victim candidate first before evicting existing non-LRU lines in the LLC.

Some embodiments may focus on a specific DBP bin, which may be referred to as single re-use, that corresponds to a use count value of one (1) and a trip count value of zero (0). In accordance with some embodiments, a single re-use data line is read from the main memory (e.g., either directly as a core demand or MLC pre-fetch, or pre-fetched into the LLC as an LLC pre-fetch and then read from the LLC) and is accessed exactly once in the MLC.

As noted above, DBP technology may utilize observer sets to detect a streaming scenario. The observer sets provide an indication if there is a re-use of the lines from the LLC. The core then tries to prevent thrashing from the follower sets. For the example "Streaming" scenario from FIG. 10, because there is almost no re-use from the LLC, the core learns about this streaming pattern from the observer set and then bypasses the LLC for the "A", "B", "C" and "D" accesses. With the bypass, the footprint that was in the LLC prior to the streaming access may be retained. The bypass may be achieved by installing the MLC evictions of the streaming buffers at LRU. The LRU lines become the candidates for the next LLC eviction thereby preserving the existing lines in the LLC which might see a future re-use.

For the example "Single Re-Use" scenario from FIG. 10, DBP technology detects "D1" as streaming and hence bypasses "D1" for the follower. The "C1" buffer is treated in the same way as the buffer "D1". The re-use of the buffer "C1" is seen only in "C2" in the observer sets. Conventionally, however, "C1" is entirely bypassed for the follower sets and accordingly "C2" turns out to be an LLC Miss though the capacity fits in the LLC. Single re-use data presents a problem for conventional non-inclusive LLC with DBP, because there is no way to predict the capacity of the incoming buffer. The DBP learns the re-use only when it observes the second iteration of the buffer access in the observer set, which is too late, and the buffer is already bypassed for the first iteration in the follower sets. For the example "Multi Re-Use" scenario in FIG. 10, the observer set learns about the re-use during the second iteration and now installs the buffer at a higher age for the follower sets, which ensures that the third and subsequent re-use is captured in the LLC.

Conventionally, for an MLC eviction which DBP marks as dead, the line is installed in LRU if an invalid block is available in the LLC to prevent future thrashing (e.g., because the line itself becomes the first candidate for eviction from the LLC). With the line in LRU, however, there is a chance of getting an opportunistic LLC hit before getting evicted. While this technique works with most of the DBP bins, this technique cannot capture the "Single Re-Use" scenario. The moment the application accesses a new buffer during the first iteration, DBP marks all evictions as "dead" until it starts achieving re-use for the second iteration in the observer sets.

As noted above, a cache controller may maintain a LHC which is incremented on every LLC hit to an earlier MLC eviction in the LLC. In order to solve the problem of capturing single re-use data, some embodiments may check the global LLC hit rate in the observer set across all DBP bins. The global LLC hit rate in the observer set across all DBP bins may indicate from history if the application has seen any kind of re-use from the LLC independent of the DBP bin. Some embodiments of SRP technology may check the following two parameters: A) if the LHC is greater than a threshold, signifying re-use from the LLC; and B) if the origin of the request was main memory. When both these conditions are met, the data may be installed from the MLC in MRU instead of LRU. Embodiments identify main memory as the source of a request that may potentially observe future re-use, which is not captured by conventional DBP techniques for non-inclusive LLC.

Figure 11:
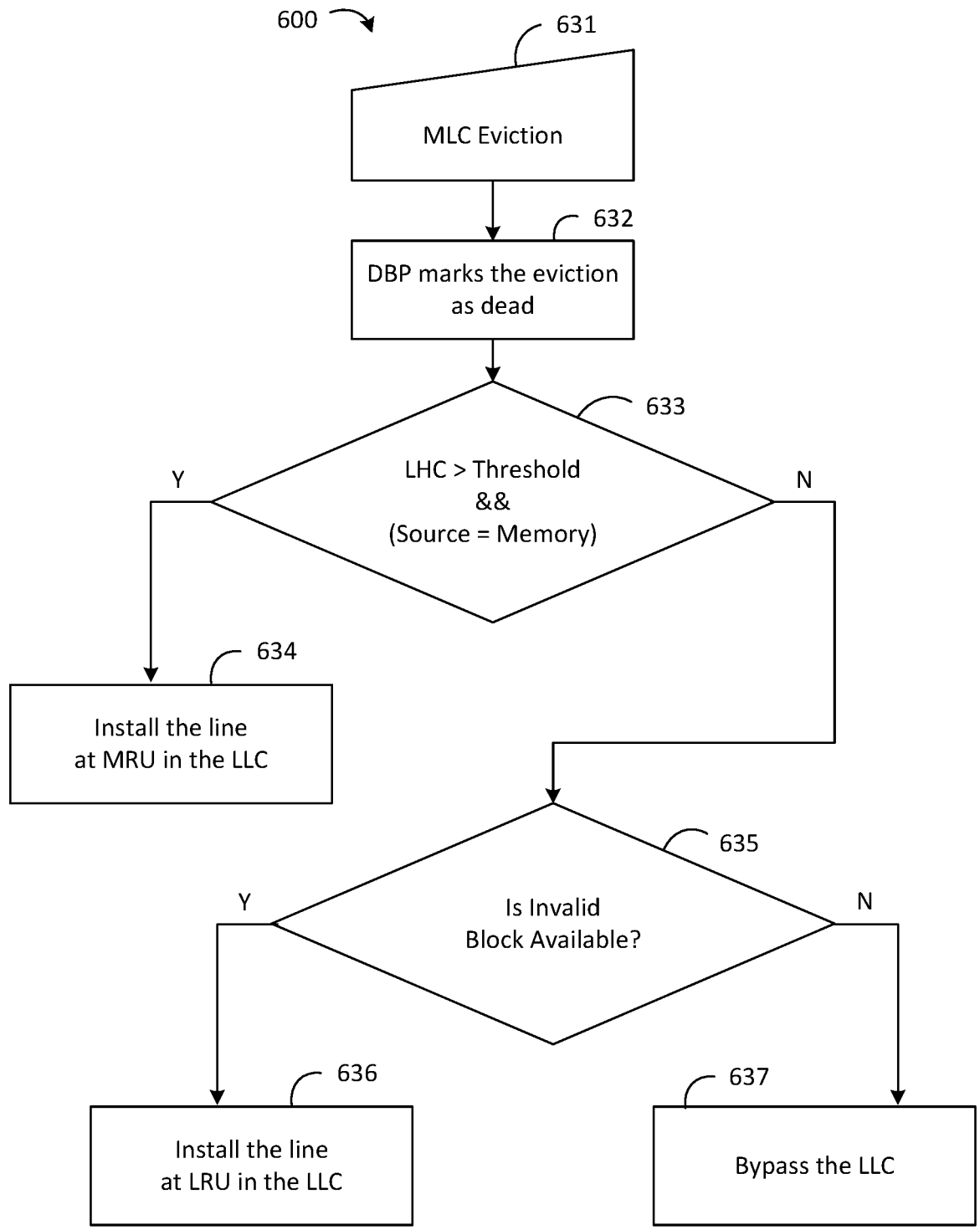
FIG. 11 is a flow diagram of another example of a method of controlling a cache according to an embodiment.

With reference to FIG. 11, an embodiment of a method 600 of controlling a cache may start with an MLC eviction of a data line at box 631 that DBP marks as dead at box 632. The method 600 may then include determining if LHC is greater than a threshold value and if a source of the data line is main memory at box 633. If the two conditions are both met at box 633, the method 600 may proceed to installing the line at MRU in the LLC at box 634. If the two conditions are not both met at box 633, the method 600 may proceed to determining if an invalid block is available at box 635 and, if so, installing the line at LRU in the LLC at box 636. Otherwise the method 600 may proceed to bypassing the LLC at box 637.

Figure 12:
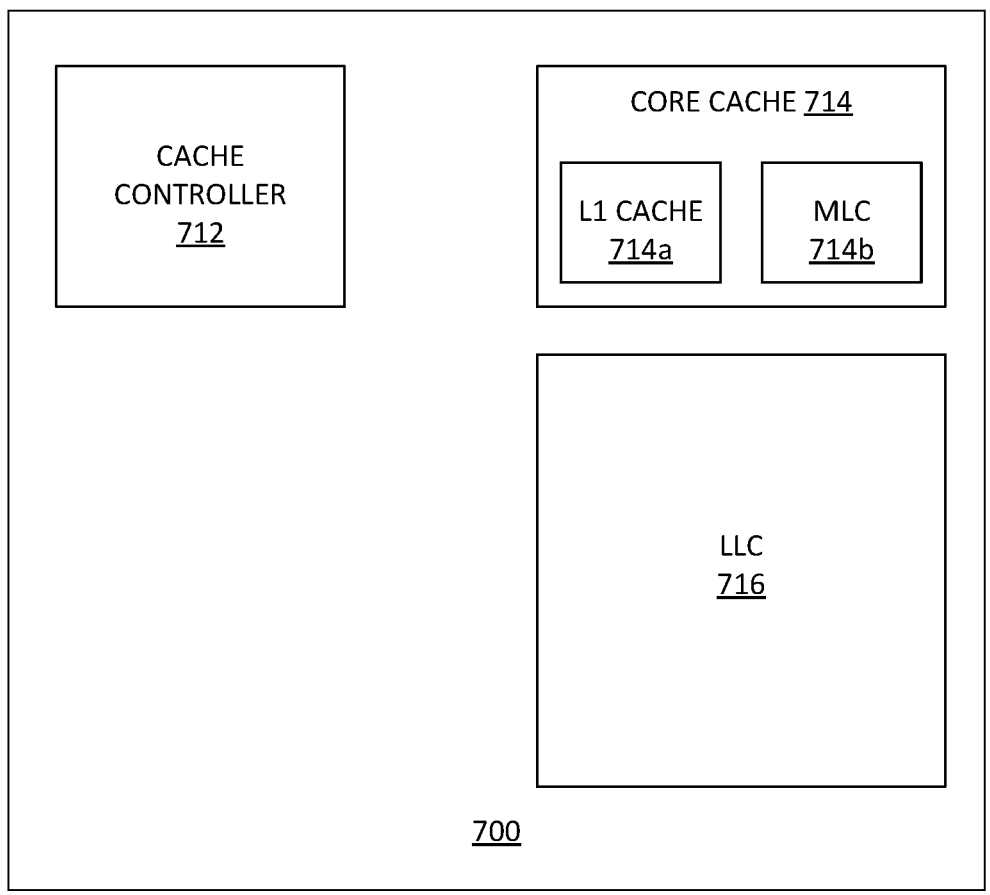
FIG. 12 is a block diagram of another example of a cache system according to an embodiment.

With reference to FIG. 12, an embodiment of a cache system 700 includes a cache controller 712 communicatively coupled to a core cache 714, and a LLC 716. The core cache 714 includes a L1 cache 714a and a MLC 714b). The cache controller 712 maintains a LHC which is incremented on every LLC hit to an earlier MLC eviction in the LLC 716. The cache controller 712 is configured with SRP technology to handle an eviction of a data line from the MLC 714b that is marked as dead as follows. The cache controller 712 determines if LHC is greater than a threshold value and if a source of the data line is main memory. If the two conditions are both met, the cache controller 712 proceeds to install the line at MRU in the LLC 716. If the two conditions are not both, the cache controller 712 proceeds to determine if an invalid block is available in the LLC 716 and, if so, the cache controller 712 installs the line at LRU in the LLC 716.

Otherwise, if an invalid block is not available in the LLC 716, the cache controller 712 proceeds to bypass the LLC 716.

Performance modeling of embodiments of SRP technology in a cycle accurate model shows increased LLC hit rate for single re-use data, increased instructions per cycle (IPC), and reduced memory access (improved bandwidth), as compared to a baseline non-exclusive LLC without SRP technology.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 13B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 15:
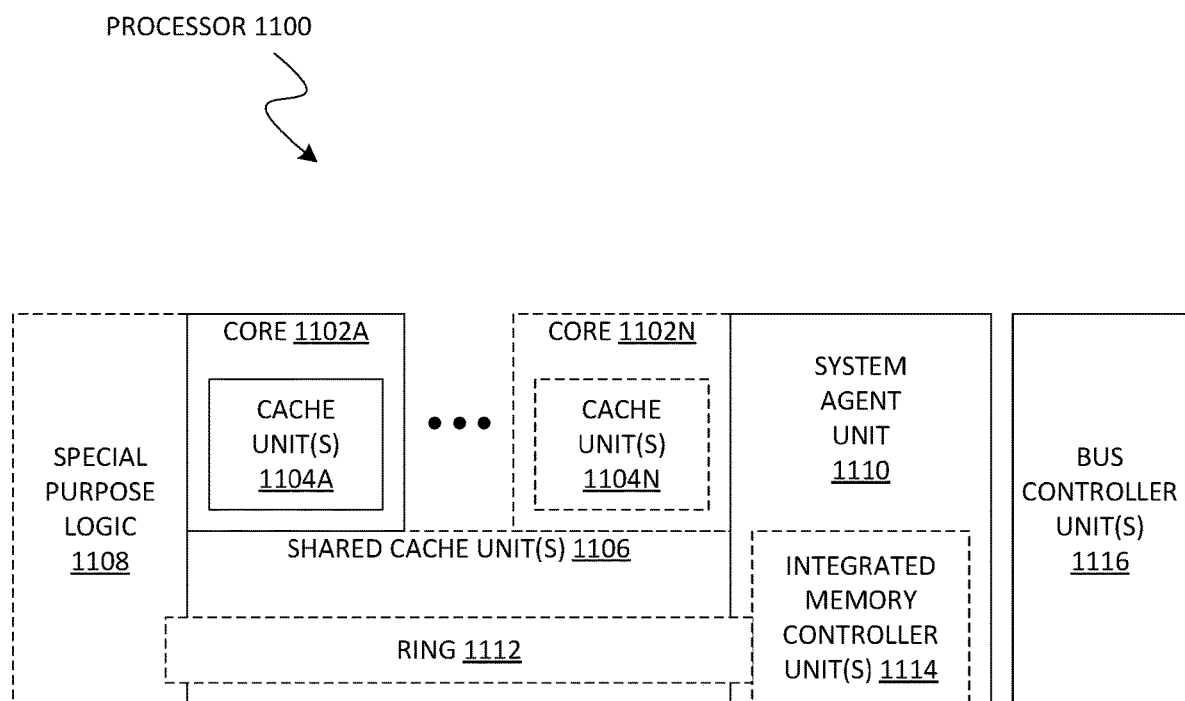
FIG. 15 is a block diagram of a processor that may have more than one core, may have an integrated memory controller, and may have integrated graphics according to embodiments of the invention.

FIG. 15 is a block diagram of a processor 1100 that may have more than one core, may have an integrated memory controller, and may have integrated graphics according to embodiments of the invention. The solid lined boxes in FIG. 15 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
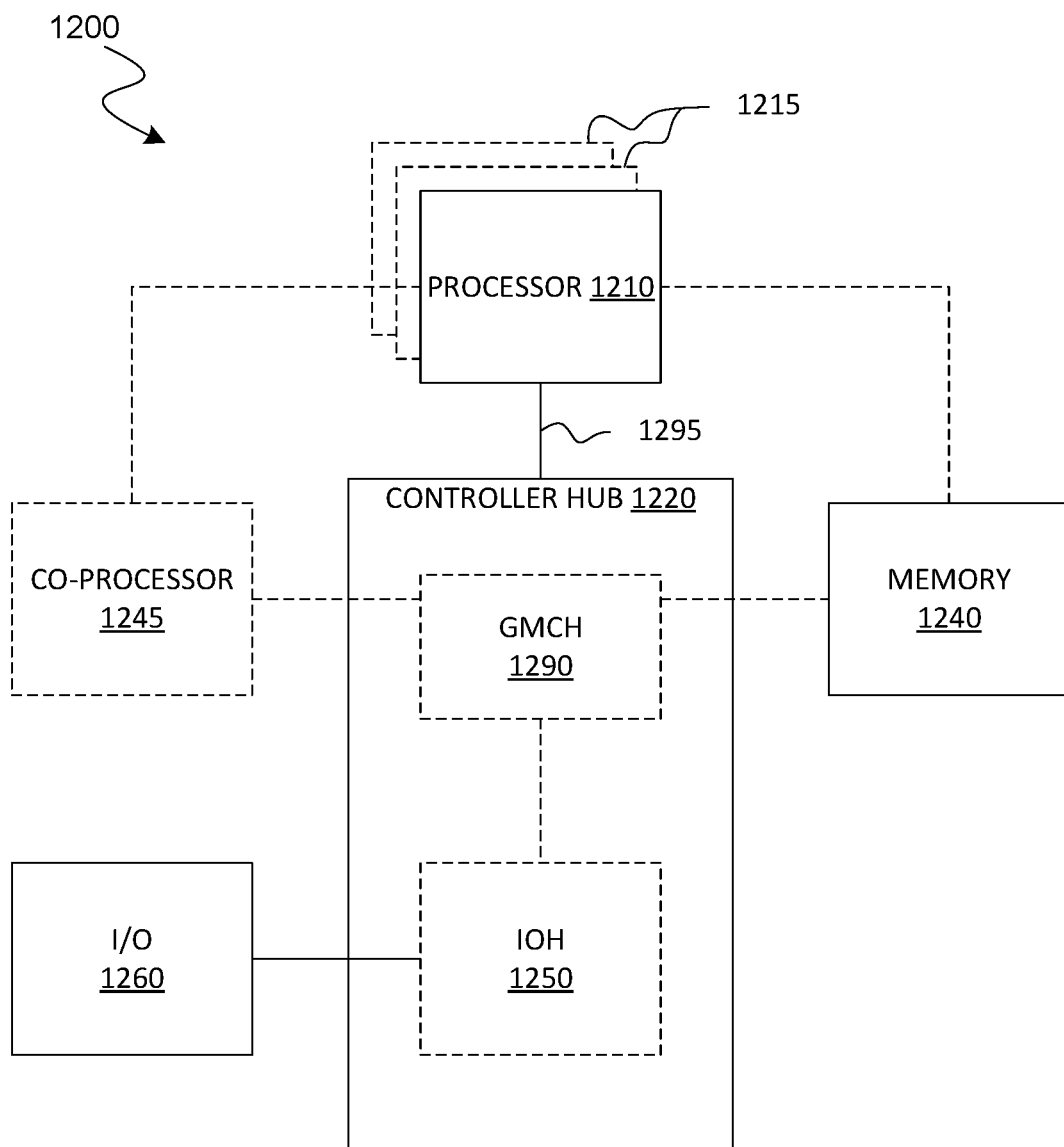
FIGS. 16-19 are block diagrams of exemplary computer architectures.

Referring now to FIG. 16, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 16 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor (s) 1245 accept and execute the received coprocessor instructions.

Figure 17:
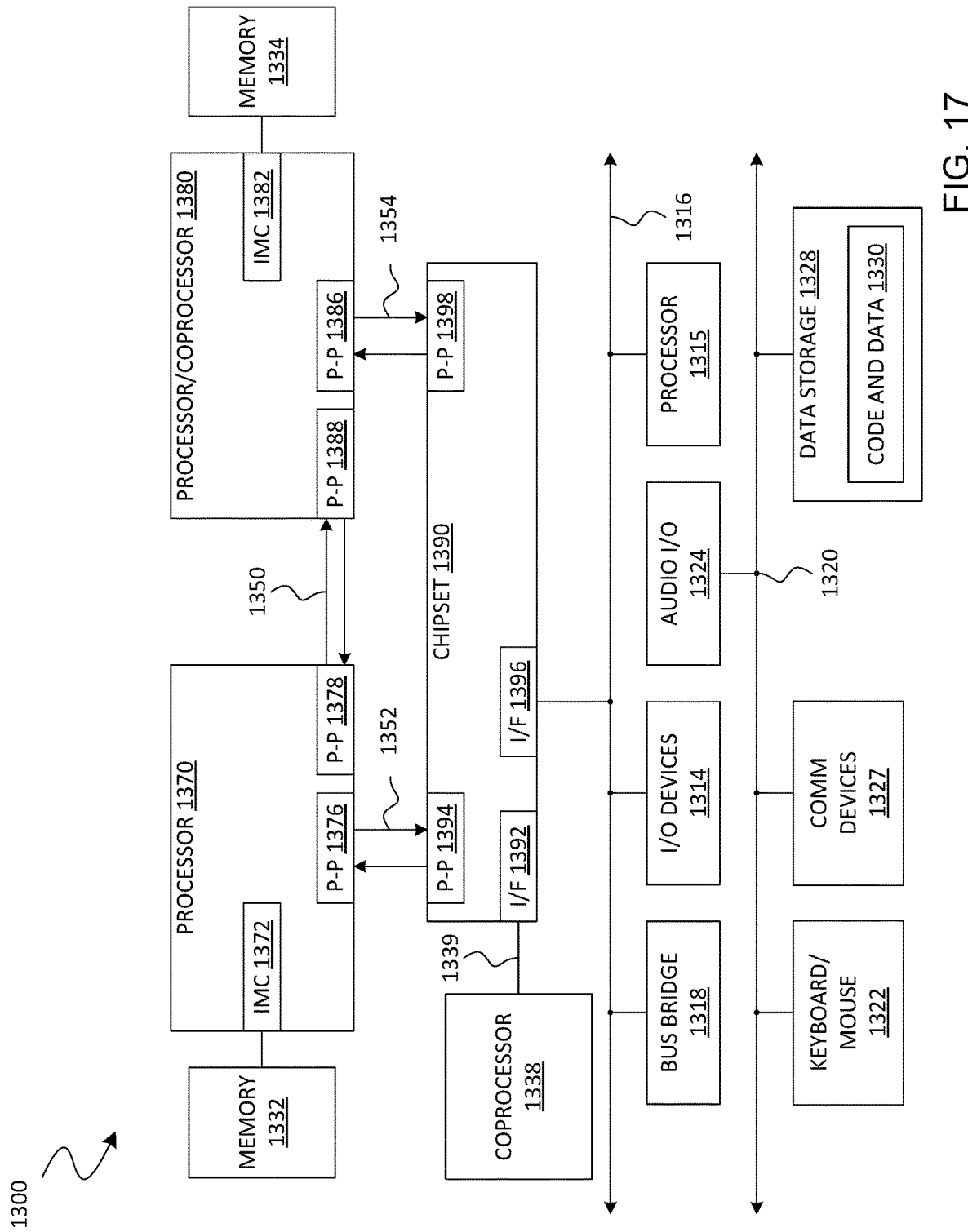

Referring now to FIG. 17, shown is a block diagram of a first more specific exemplary system 1300 in accordance with an embodiment of the present invention. As shown in FIG. 17, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 17, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 17, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 17, a system may implement a multi-drop bus or other such architecture.

Figure 18:
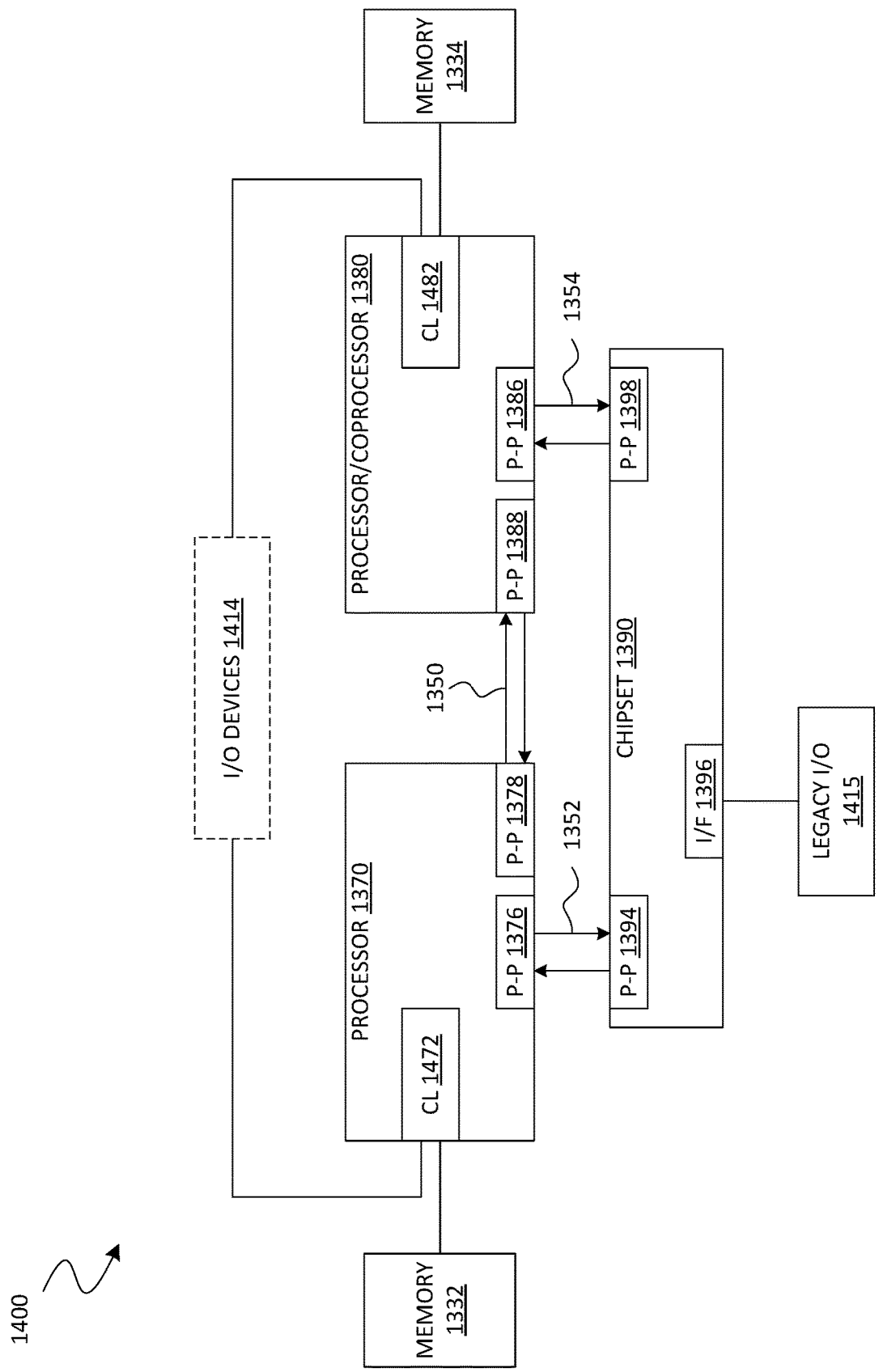

Referring now to FIG. 18, shown is a block diagram of a second more specific exemplary system 1400 in accordance with an embodiment of the present invention Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1370, 1380 may include integrated memory and I/O control logic ("CL") 1472 and 1482, respectively. Thus, the CL 1472, 1482 include integrated memory controller units and include I/O control logic. FIG. 18 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 19, shown is a block diagram of a SoC 1500 in accordance with an embodiment of the present invention. Similar elements in FIG. 15 bear like reference numerals. Also, dashed lined boxes are optional features on more advanced SoCs. In FIG. 19, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 20 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for instruction set architecture opcode parameterization are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

ADDITIONAL NOTES AND EXAMPLES

Example 1 includes an integrated circuit, comprising a core, and a cache controller coupled to the core, the cache controller including circuitry to identify data from a working set for dynamic inclusion in a next level cache based on an amount of re-use of the next level cache, send a shared copy of the identified data to a requesting core of one or more processor cores, and maintain a copy of the identified data in the next level cache.

Example 2 includes the integrated circuit of example 1, wherein the circuitry is further to determine dynamic inclusion of data in the next level cache on a per data line basis.

Example 3 includes the integrated circuit of example 1, wherein the circuitry is further to increment a counter value when a hit in the next level cache corresponds to an eviction from a core cache, and identify a current data hit in the next level cache for dynamic inclusion in the next level cache if the current data hit corresponds to an eviction from the core cache and if the counter value is greater than a threshold.

Example 4 includes the integrated circuit of example 3, wherein the circuitry is further to set a snoop filter to indicate that the requesting core is valid for the current data hit.

Example 5 includes the integrated circuit of example 4, wherein, if the current data hit does not correspond to an eviction from the core cache or if the counter value is not greater than the threshold, the circuitry is further to send an exclusive copy of the data to the requesting core, update an entry in the snoop filter to indicate a core identifier of the requesting core, and deallocate the data in the next level cache.

Example 6 includes the integrated circuit of example 1, wherein the circuitry is further to silently drop data to be evicted from a core cache if the data to be evicted from the core cache has a shared copy of the data in the next level cache.

Example 7 includes the integrated circuit of example 1, wherein the next level cache comprises a non-inclusive last level cache.

Example 8 includes a method of controlling a cache, comprising identifying data from a working set for dynamic inclusion in a next level cache based on an amount of re-use of the next level cache, sending a shared copy of the identified data to a requesting core of one or more processor cores, and maintaining a copy of the identified data in the next level cache.

Example 9 includes the method of example 8, further comprising determining dynamic inclusion of data in the next level cache on a per data line basis.

Example 10 includes the method of example 8, further comprising incrementing a counter value when a hit in the next level cache corresponds to an eviction from a core cache, and identifying a current data hit in the next level cache for dynamic inclusion in the next level cache if the current data hit corresponds to an eviction from the core cache and if the counter value is greater than a threshold.

Example 11 includes the method of example 10, further comprising setting a snoop filter to indicate that the requesting core is valid for the current data hit.

Example 12 includes the method of example 11, wherein, if the current data hit does not correspond to an eviction from the core cache or if the counter value is not greater than the threshold, the method further comprises sending an exclusive copy of the data to the requesting core, updating an entry in the snoop filter to indicate a core identifier of the requesting core, and deallocating the data in the next level cache.

Example 13 includes the method of example 8, further comprising silently dropping data to be evicted from a core cache if the data to be evicted from the core cache has a shared copy of the data in the next level cache.

Example 14 includes an apparatus, comprising one or more processor cores, a core cache co-located with and communicatively coupled to the one or more processor cores, a next level cache co-located with and communicatively coupled to the core cache and the one or more processor cores, and a cache controller co-located with and communicatively coupled to the core cache, the next level cache, and the one or more processor cores, the cache controller including circuitry to identify data from a working set for dynamic inclusion in the next level cache based on an amount of re-use of the next level cache, send a shared copy of the identified data to a requesting core of the one or more processor cores, and maintain a copy of the identified data in the next level cache.

Example 15 includes the apparatus of example 14, wherein the circuitry is further to determine dynamic inclusion of data in the next level cache on a per data line basis.

Example 16 includes the apparatus of example 14, wherein the circuitry is further to increment a counter value when a hit in the next level cache corresponds to an eviction from the core cache, and identify a current data hit in the next level cache for dynamic inclusion in the next level cache if the current data hit corresponds to an eviction from the core cache and if the counter value is greater than a threshold.

Example 17 includes the apparatus of example 16, wherein the circuitry is further to set a snoop filter to indicate that the requesting core is valid for the current data hit.

Example 18 includes the apparatus of example 16, wherein, if the current data hit does not correspond to an eviction from the core cache or if the counter value is not greater than the threshold, the circuitry is further to send an exclusive copy of the data to the requesting core, update an entry in the snoop filter to indicate a core identifier of the requesting core, and deallocate the data in the next level cache.

Example 19 includes the apparatus of example 14, wherein the circuitry is further to silently drop data to be evicted from a core cache if the data to be evicted from the core cache has a shared copy of the data in the next level cache.

Example 20 includes the apparatus of example 14, wherein the next level cache comprises a non-inclusive last level cache.

Example 21 includes a cache controller apparatus, comprising means for identifying data from a working set for dynamic inclusion in a next level cache based on an amount of re-use of the next level cache, means for sending a shared copy of the identified data to a requesting core of one or more processor cores, and means for maintaining a copy of the identified data in the next level cache.

Example 22 includes the apparatus of example 21, further comprising means for determining dynamic inclusion of data in the next level cache on a per data line basis.

Example 23 includes the apparatus of example 21, further comprising means for incrementing a counter value when a hit in the next level cache corresponds to an eviction from a core cache, and means for identifying a current data hit in the next level cache for dynamic inclusion in the next level cache if the current data hit corresponds to an eviction from the core cache and if the counter value is greater than a threshold.

Example 24 includes the apparatus of example 23, further comprising means for setting a snoop filter to indicate that the requesting core is valid for the current data hit.

Example 25 includes the apparatus of example 24, wherein, if the current data hit does not correspond to an eviction from the core cache or if the counter value is not greater than the threshold, the method further comprises means for sending an exclusive copy of the data to the requesting core, means for updating an entry in the snoop filter to indicate a core identifier of the requesting core, and means for deallocating the data in the next level cache.

Example 26 includes the apparatus of example 21, further comprising means for silently dropping data to be evicted from a core cache if the data to be evicted from the core cache has a shared copy of the data in the next level cache.

Example 27 includes at least one non-transitory machine readable medium comprising a plurality of instructions that, in response to being executed on a computing device, cause the computing device to identify data from a working set for dynamic inclusion in a next level cache based on an amount of re-use of the next level cache, send a shared copy of the identified data to a requesting core of one or more processor cores, and maintain a copy of the identified data in the next level cache.

Example 28 includes the at least one non-transitory machine readable medium of example 27, comprising a plurality of further instructions that, in response to being executed on the computing device, cause the computing device to determine dynamic inclusion of data in the next level cache on a per data line basis.

Example 29 includes the at least one non-transitory machine readable medium of example 27, comprising a plurality of further instructions that, in response to being executed on the computing device, cause the computing device to increment a counter value when a hit in the next level cache corresponds to an eviction from a core cache, and identify a current data hit in the next level cache for dynamic inclusion in the next level cache if the current data hit corresponds to an eviction from the core cache and if the counter value is greater than a threshold.

Example 30 includes the at least one non-transitory machine readable medium of example 29, comprising a plurality of further instructions that, in response to being executed on the computing device, cause the computing device to set a snoop filter to indicate that the requesting core is valid for the current data hit.

Example 31 includes the at least one non-transitory machine readable medium of example 30, comprising a plurality of further instructions that, in response to being executed on the computing device, if the current data hit does not correspond to an eviction from the core cache or if the counter value is not greater than the threshold, cause the computing device to send an exclusive copy of the data to the requesting core, update an entry in the snoop filter to indicate a core identifier of the requesting core, and deallocate the data in the next level cache.

Example 32 includes the at least one non-transitory machine readable medium of example 27, comprising a plurality of further instructions that, in response to being executed on the computing device, cause the computing device to silently drop data to be evicted from a core cache if the data to be evicted from the core cache has a shared copy of the data in the next level cache.

Example 33 includes an integrated circuit, comprising a core, and a cache controller coupled to the core, the cache controller including circuitry to identify single re-use data evicted from a core cache, and retain the identified single re-use data in a next level cache based on an overall re-use of the next level cache.

Example 34 includes the integrated circuit of example 33, wherein a source of the single re-use data is main memory.

Example 35 includes the integrated circuit of example 34, wherein the circuitry is further to determine a use count for a data line based on a number of core cache hits experienced by the data line when the data line is resident in the core cache, determine a trip count for the data line based on a number of trips made by the data line between the core cache and the next level cache from when the data line is brought into one or more of the core cache and the next level cache until the data line is evicted from the next level cache, and identify the single re-use data based on a use count of one and trip count of zero.

Example 36 includes the integrated circuit of example 33, wherein the circuitry is further to increment a counter value when a hit in the next level cache corresponds to an eviction from the core cache.

Example 37 includes the integrated circuit of example 36, wherein the circuitry is further to evict a data line from the core cache, mark the evicted data line as dead, and install the evicted data line marked as dead as a most recently used data line in the next level cache if the counter value is greater than a threshold and if a source of the data line is main memory.

Example 38 includes the integrated circuit of example 37, wherein, if the counter value is not greater than the threshold or if a source of the data line is not main memory, the circuitry is further to install the evicted data line marked as dead as a least recently used data line in the next level cache if an invalid block is available in the next level cache.

Example 39 includes the integrated circuit of example 37, wherein, if the counter value is not greater than the threshold or if a source of the data line is not main memory, the circuitry is further to bypass the next level cache if an invalid block is not available in the next level cache.

Example 40 includes a method of controlling a cache, comprising identifying single re-use data evicted from a core cache, and retaining the identified single re-use data in a next level cache based on an overall re-use of the next level cache.

Example 41 includes the method of example 40, wherein a source of the single re-use data is main memory.

Example 42 includes the method of example 41, further comprising determining a use count for a data line based on a number of core cache hits experienced by the data line when the data line is resident in the core cache, determining a trip count for the data line based on a number of trips made by the data line between the core cache and the next level cache from when the data line is brought into one or more of the core cache and the next level cache until the data line is evicted from the next level cache, and identifying the data line as single re-use data based on a use count of one and trip count of zero.

Example 43 includes the method of example 40, further comprising incrementing a counter value when a hit in the next level cache corresponds to an eviction from the core cache.

Example 44 includes the method of example 43, further comprising evicting a data line from the core cache, marking the evicted data line as dead, and installing the evicted data line marked as dead as a most recently used data line in the next level cache if the counter value is greater than a threshold and if a source of the data line is main memory.

Example 45 includes the method of example 44, wherein, if the counter value is not greater than the threshold or if a source of the data line is not main memory, the method further comprises installing the evicted data line marked as dead as a least recently used data line in the next level cache if an invalid block is available in the next level cache, and bypassing the next level cache if an invalid block is not available in the next level cache.

Example 46 includes an apparatus, comprising one or more processor cores, a core cache co-located with and communicatively coupled to the one or more processor cores, a next level cache co-located with and communicatively coupled to the core cache and the one or more processor cores, and a cache controller co-located with and communicatively coupled to the core cache, the next level cache, and the one or more processor cores, the cache controller including circuitry to identify single re-use data evicted from the core cache, and retain the identified single re-use data in the next level cache based on an overall re-use of the next level cache.

Example 47 includes the apparatus of example 46, wherein a source of the single re-use data is main memory.

Example 48 includes the apparatus of example 47, wherein the circuitry is further to determine a use count for a data line based on a number of core cache hits experienced by the data line when the data line is resident in the core cache, determine a trip count for the data line based on a number of trips made by the data line between the core cache and the next level cache from when the data line is brought into one or more of the core cache and the next level cache until the data line is evicted from the next level cache, and identify the single re-use data based on a use count of one and trip count of zero.

Example 49 includes the apparatus of example 46, wherein the circuitry is further to increment a counter value when a hit in the next level cache corresponds to an eviction from the core cache.

Example 50 includes the apparatus of example 49, wherein the circuitry is further to evict a data line from the core cache, mark the evicted data line as dead, and install the evicted data line marked as dead as a most recently used data line in the next level cache if the counter value is greater than a threshold and if a source of the data line is main memory.

Example 51 includes the apparatus of example 50, wherein, if the counter value is not greater than the threshold or if a source of the data line is not main memory, the circuitry is further to install the evicted data line marked as dead as a least recently used data line in the next level cache if an invalid block is available in the next level cache.

Example 52 includes the apparatus of example 50, wherein, if the counter value is not greater than the threshold or if a source of the data line is not main memory, the circuitry is further to bypass the next level cache if an invalid block is not available in the next level cache.

Example 53 includes a cache controller apparatus, comprising means for identifying single re-use data evicted from a core cache, and means for retaining the identified single re-use data in a next level cache based on an overall re-use of the next level cache.

Example 54 includes the apparatus of example 53, wherein a source of the single re-use data is main memory.

Example 55 includes the apparatus of example 54, further comprising means for determining a use count for a data line based on a number of core cache hits experienced by the data line when the data line is resident in the core cache, means for determining a trip count for the data line based on a number of trips made by the data line between the core cache and the next level cache from when the data line is brought into one or more of the core cache and the next level cache until the data line is evicted from the next level cache, and means for identifying the data line as single re-use data based on a use count of one and trip count of zero.

Example 56 includes the apparatus of example 53, further comprising means for incrementing a counter value when a hit in the next level cache corresponds to an eviction from the core cache.

Example 57 includes the apparatus of example 56, further comprising means for evicting a data line from the core cache, means for marking the evicted data line as dead, and means for installing the evicted data line marked as dead as a most recently used data line in the next level cache if the counter value is greater than a threshold and if a source of the data line is main memory.

Example 58 includes the apparatus of example 57, wherein, if the counter value is not greater than the threshold or if a source of the data line is not main memory, the circuitry is further to means for installing the evicted data line marked as dead as a least recently used data line in the next level cache if an invalid block is available in the next level cache, and means for bypassing the next level cache if an invalid block is not available in the next level cache.

Example 59 includes at least one non-transitory machine readable medium comprising a plurality of instructions that, in response to being executed on a computing device, cause the computing device to identify single re-use data evicted from a core cache, and retain the identified single re-use data in a next level cache based on an overall re-use of the next level cache.

Example 60 includes the at least one non-transitory machine readable medium of example 59, wherein a source of the single re-use data is main memory.

Example 61 includes the at least one non-transitory machine readable medium of example 60, comprising a plurality of further instructions that, in response to being executed on the computing device, cause the computing device to determine a use count for a data line based on a number of core cache hits experienced by the data line when the data line is resident in the core cache, determine a trip count for the data line based on a number of trips made by the data line between the core cache and the next level cache from when the data line is brought into one or more of the core cache and the next level cache until the data line is evicted from the next level cache, and identify the data line as single re-use data based on a use count of one and trip count of zero.

Example 62 includes the at least one non-transitory machine readable medium of example 59, comprising a plurality of further instructions that, in response to being executed on the computing device, cause the computing device to increment a counter value when a hit in the next level cache corresponds to an eviction from the core cache.

Example 64 includes the at least one non-transitory machine readable medium of example 63, comprising a plurality of further instructions that, in response to being executed on the computing device, cause the computing device to evict a data line from the core cache, mark the evicted data line as dead, and install the evicted data line marked as dead as a most recently used data line in the next level cache if the counter value is greater than a threshold and if a source of the data line is main memory.

Example 65 includes the at least one non-transitory machine readable medium of example 64, comprising a plurality of further instructions that, in response to being executed on the computing device, if the counter value is not greater than the threshold or if a source of the data line is not main memory, cause the computing device to install the evicted data line marked as dead as a least recently used data line in the next level cache if an invalid block is available in the next level cache, and bypass the next level cache if an invalid block is not available in the next level cache.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
   a core; and
   a cache controller coupled to the core, the cache controller including circuitry to:
   increment a counter value when a hit in a next level cache corresponds to an eviction from a core cache;
   perform an evaluation to test for a condition wherein:
   a current data hit corresponds to another eviction from the core cache, the current data hit comprising data from a working set; and
   the counter value is greater than a threshold;
   wherein, where the evaluation indicates a presence of the condition, the circuitry is further to:
   identify the data from the working set for dynamic inclusion in the next level cache;
   send a shared copy of the identified data to a requesting core of one or more processor cores;
   maintain a copy of the identified data in the next level cache; and
   set a snoop filter to indicate that the requesting core is valid for the current data hit.

2. The integrated circuit of claim 1, wherein the circuitry is further to:
   determine dynamic inclusion of data in the next level cache on a per data line basis.

3. The integrated circuit of claim 1, wherein, if the current data hit does not correspond to the other eviction from the core cache or if the counter value is not greater than the threshold, the circuitry is further to:
   send an exclusive copy of the data to the requesting core;
   update an entry in the snoop filter to indicate a core identifier of the requesting core; and
   deallocate the data in the next level cache.

4. The integrated circuit of claim 1, wherein the circuitry is further to:
   silently drop data to be evicted from a core cache if the data to be evicted from the core cache has a shared copy of the data in the next level cache.

5. The integrated circuit of claim 1, wherein the next level cache comprises a non-inclusive last level cache.

6. A method of controlling a cache, the method comprising:
   incrementing a counter value when a hit in a next level cache corresponds to an eviction from a core cache;
   performing an evaluation to test for a condition wherein:
   a current data hit corresponds to another eviction from the core cache, the current data hit comprising data from a working set; and
   the counter value is greater than a threshold; and
   where the evaluation indicates a presence of the condition:
   identifying the data from the working set for dynamic inclusion in the next level cache;
   sending a shared copy of the identified data to a requesting core of one or more processor cores;
   maintaining a copy of the identified data in the next level cache; and
   setting a snoop filter to indicate that the requesting core is valid for the current data hit.

7. The method of claim 6, further comprising:
   determining dynamic inclusion of data in the next level cache on a per data line basis.

8. The method of claim 6, wherein, if the current data hit does not correspond to the other eviction from the core cache or if the counter value is not greater than the threshold, the method further comprises:
   sending an exclusive copy of the data to the requesting core;
   updating an entry in the snoop filter to indicate a core identifier of the requesting core; and
   deallocating the data in the next level cache.

9. The method of claim 6, further comprising:
   silently dropping data to be evicted from a core cache if the data to be evicted from the core cache has a shared copy of the data in the next level cache.

10. An apparatus, comprising:
    one or more processor cores;
    a core cache co-located with and communicatively coupled to the one or more processor cores;
    a next level cache co-located with and communicatively coupled to the core cache and the one or more processor cores; and
    a cache controller co-located with and communicatively coupled to the core cache, the next level cache, and the one or more processor cores, the cache controller including circuitry to:
    increment a counter value when a hit in a next level cache corresponds to an eviction from a core cache;
    perform an evaluation to test for a condition wherein:
    a current data hit corresponds to another eviction from the core cache, the current data hit comprising data from a working set; and
    the counter value is greater than a threshold;
    wherein, where the evaluation indicates a presence of the condition, the circuitry is further to:
    identify the data from the working set for dynamic inclusion in the next level cache,
    send a shared copy of the identified data to a requesting core of the one or more processor cores;
    maintain a copy of the identified data in the next level cache; and
    set a snoop filter to indicate that the requesting core is valid for the current data hit.

11. The apparatus of claim 10, wherein the circuitry is further to:
    determine dynamic inclusion of data in the next level cache on a per data line basis.

12. The apparatus of claim 10, wherein, if the current data hit does not correspond to an eviction from the core cache or if the counter value is not greater than the threshold, the circuitry is further to:
    send an exclusive copy of the data to the requesting core;

update an entry in the snoop filter to indicate a core identifier of the requesting core; and deallocate the data in the next level cache.

13. The apparatus of claim 10, wherein the circuitry is further to:

silently drop data to be evicted from a core cache if the data to be evicted from the core cache has a shared copy of the data in the next level cache.

14. The apparatus of claim 10, wherein the next level cache comprises a non-inclusive last level cache.

* * * * *